US008897138B2

(12) United States Patent
Yu et al.

(10) Patent No.: US 8,897,138 B2
(45) Date of Patent: Nov. 25, 2014

(54) SYSTEMS AND METHODS FOR CONFIGURING A NETWORK SWITCH APPLIANCE

(71) Applicant: Gigamon LLC, Milpitas, CA (US)

(72) Inventors: Jay Han Yu, San Jose, CA (US); Patrick Pak Tak Leong, Palo Alto, CA (US)

(73) Assignee: Gigamon Inc., Milpitas, CA (US)

( * ) Notice: Subject to any disclaimer, the term of this patent is extended or adjusted under 35 U.S.C. 154(b) by 102 days.

(21) Appl. No.: 13/746,608

(22) Filed: Jan. 22, 2013

(65) Prior Publication Data

US 2014/0204747 A1 Jul. 24, 2014

(51) Int. Cl.
*H04L 12/28* (2006.01)
*H04L 12/891* (2013.01)

(52) U.S. Cl.
CPC ........................................ *H04L 47/41* (2013.01)
USPC ........................................... 370/235; 370/401

(58) Field of Classification Search
USPC .................. 370/235, 401, 419, 463, 252, 254
See application file for complete search history.

(56) References Cited

U.S. PATENT DOCUMENTS

| | | | |
|---|---|---|---|
| 6,850,989 B1 * | 2/2005 | Lavian et al. | 709/242 |
| 7,424,018 B2 | 9/2008 | Gallatin et al. | |
| 7,436,832 B2 | 10/2008 | Gallatin et al. | |
| 7,440,467 B2 | 10/2008 | Gallatin et al. | |
| 7,792,047 B2 | 9/2010 | Gallatin et al. | |
| 8,315,256 B2 | 11/2012 | Leong et al. | |
| 2011/0103259 A1 * | 5/2011 | Aybay et al. | 370/254 |
| 2011/0317694 A1 | 12/2011 | Pleshek et al. | |
| 2012/0155467 A1 * | 6/2012 | Appenzeller | 370/392 |
| 2013/0034107 A1 * | 2/2013 | Leong et al. | 370/400 |
| 2013/0077968 A1 * | 3/2013 | Yang | 398/45 |
| 2013/0089026 A1 * | 4/2013 | Piper et al. | 370/328 |
| 2014/0029451 A1 * | 1/2014 | Nguyen | 370/252 |

OTHER PUBLICATIONS

International Search Report and the Written Opinion dated May 16, 2014 for PCT Patent Application No. PCT/US14/12397, 9 pages.

* cited by examiner

*Primary Examiner* — Brian D Nguyen
(74) *Attorney, Agent, or Firm* — Vista IP Law Group, LLP

(57) ABSTRACT

A method for use to configure a network switch device to implement a traffic flow configuration, the network switch device having a plurality of network ports and a plurality of instrument ports, the method includes: receiving instrument port information that identifies one or more of the instrument ports for the traffic flow configuration, wherein the instrument port information is received by a processing unit; receiving network port information that identifies one or more of the network ports for the traffic flow configuration; receiving traffic information that identifies one or more network traffic for the traffic flow configuration, wherein the traffic information is received after the instrument port information is received or after the network port information is received; and storing the instrument port information, the traffic information, and the network port information in association with each other to implement the traffic flow configuration.

29 Claims, 23 Drawing Sheets

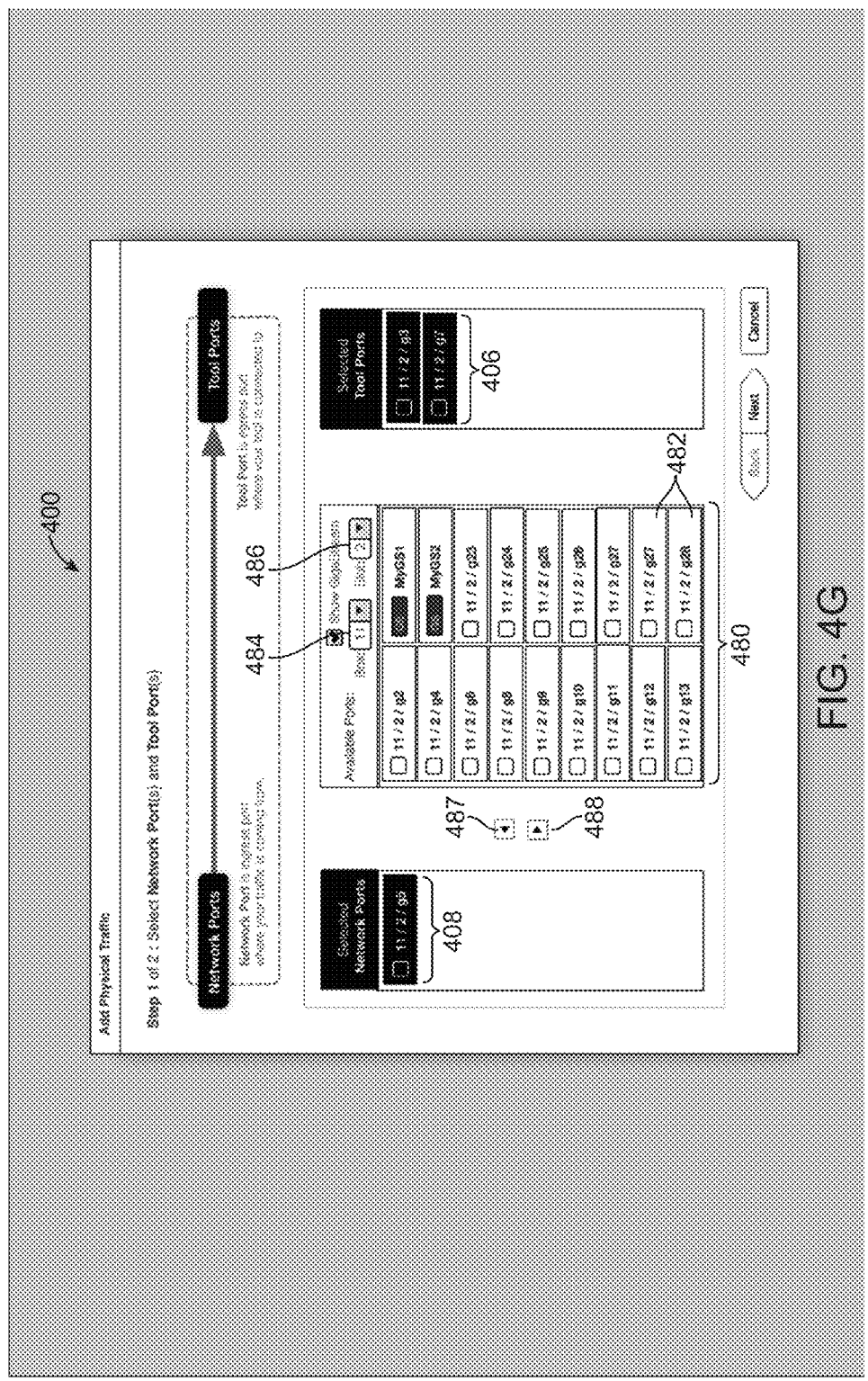

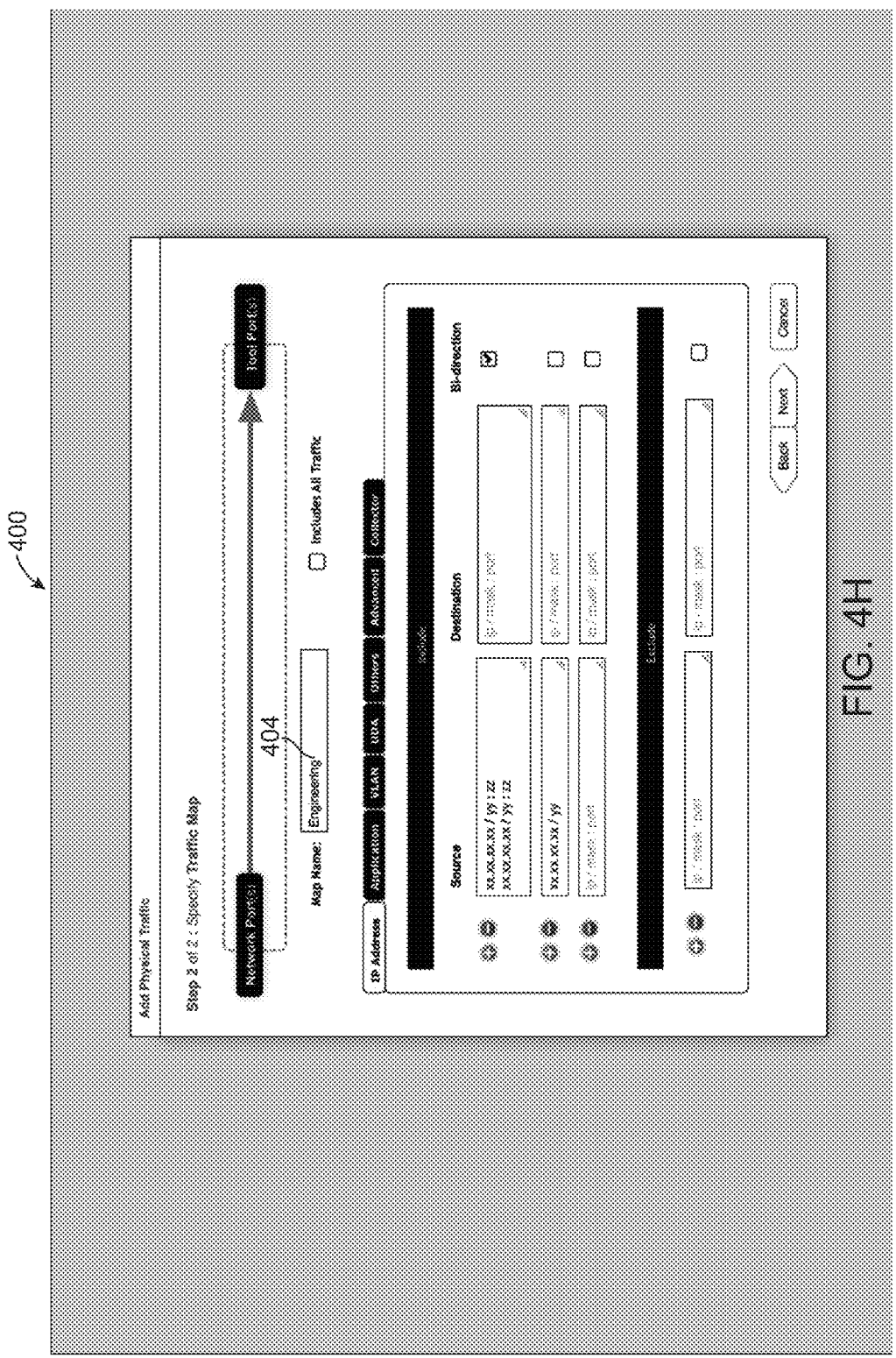

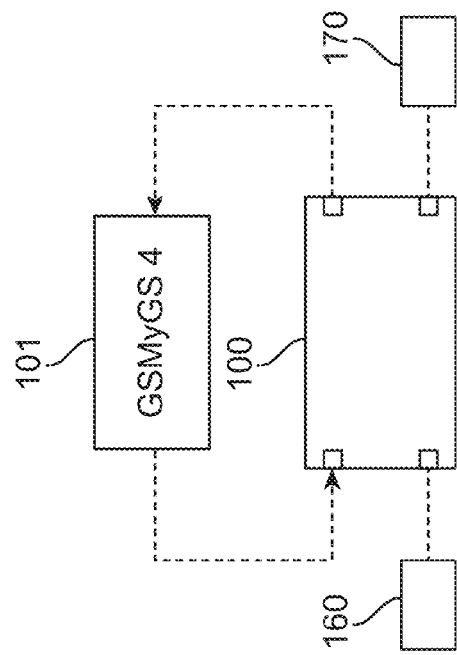
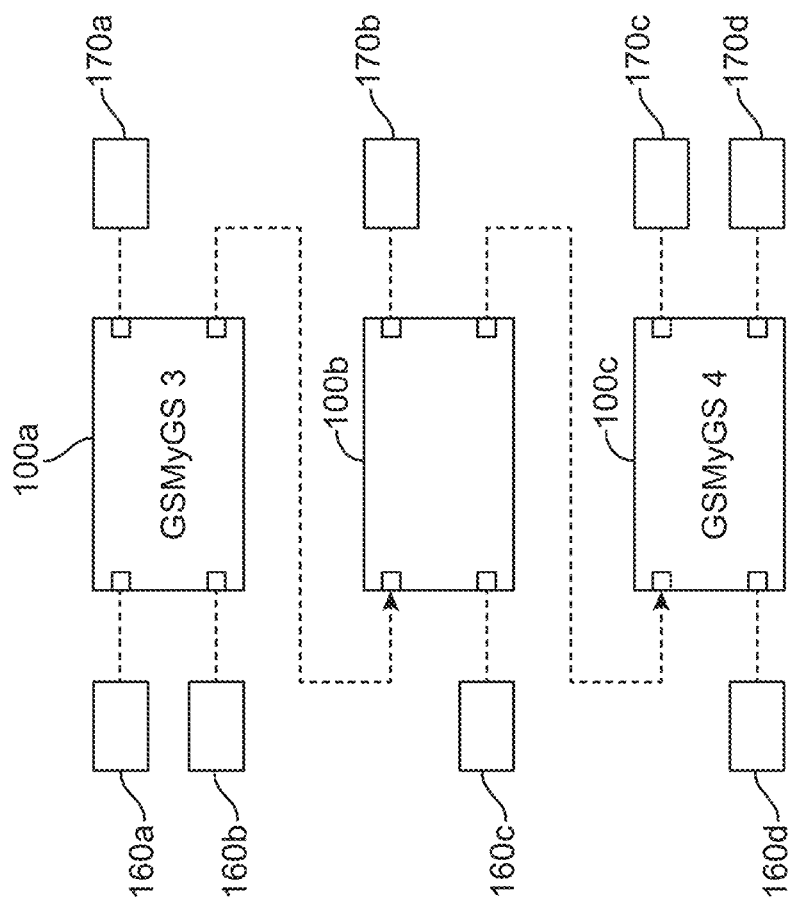
FIG. 5B
FIG. 5A

SYSTEMS AND METHODS FOR CONFIGURING A NETWORK SWITCH APPLIANCE

FIELD

This application relates generally to network switch devices, and more specifically, to systems and methods for configuring network switch appliances.

BACKGROUND

Network switch devices have been used to forward packets from one node to another node. Such network switch devices include a first network port for receiving packets from a first node, and a second network port for passing the packets to a second node. Some network switch devices may also include one or more instrument ports for transmitting packets to one or more instruments for monitoring network traffic.

Applicant of the subject application has determined that it may be desirable to have new techniques for configuring network switch devices.

SUMMARY

A method for use to configure a network switch device to implement a traffic flow configuration, the network switch device having a plurality of network ports and a plurality of instrument ports, the method includes: receiving instrument port information that identifies one or more of the instrument ports for the traffic flow configuration, wherein the instrument port information is received by a processing unit; receiving network port information that identifies one or more of the network ports for the traffic flow configuration; receiving traffic information that identifies one or more network traffic for the traffic flow configuration, wherein the traffic information is received after the instrument port information is received or after the network port information is received; and storing the instrument port information, the traffic information, and the network port information in association with each other to implement the traffic flow configuration.

Optionally, the traffic flow configuration may prescribe packets from the one or more of the network ports identified by the network port information, and belonging to the one or more network traffic identified in the traffic Information, to be passed to the one or more of the instrument ports identified in the instrument port information.

Optionally, the method may also include providing a user interface for allowing input of the instrument port information, the network port information, and the traffic information.

Optionally, the user interface may include: an instrument port section that allows input of the instrument port information; a network port section that allows input of the network port information; and a traffic information section that allows input of the traffic information.

Optionally, the instrument port section may include a field for selecting the network switch device from a plurality of network switch devices that are communicatively coupled to each other.

Optionally, the instrument port section may include a field for selecting a slot from a plurality of slots that are associated with the network switch device.

Optionally, the instrument port section may include a field for allowing a user to prescribe one of the one or more instrument ports for communicating with a network device.

Optionally, the network switch device and the network device may be both out-of-band devices.

Optionally, the network port section may include a field for allowing the user to prescribe one of the one or more network ports for communicating with the network device, and wherein the prescribed one of the one or more instrument ports may be for outputting data to the network device, and the prescribed one of the one or more network ports may be for receiving data from the network device.

Optionally, the network device may include an ancillary device configured to provide a packet processing function for the network switch device.

Optionally, the network device may include another network switch device.

Optionally, the network port section may include a field for allowing a user to prescribe one of the one or more network ports for communicating with a network device.

Optionally, the network switch device and the network device may be both out-of-band devices.

Optionally, the traffic information may include one or more of source information, destination information, bi-directional identifier, traffic type information, VLAN information, UDA information, Layer 2 information, Layer 3 information, Layer 4 information, and traffic filter information.

An apparatus for use to configure a network switch device to implement a traffic flow configuration, the network switch device having a plurality of network ports and a plurality of instrument ports, the apparatus includes: a processing unit configured for receiving instrument port information that identifies one or more of the instrument ports for the traffic flow configuration, receiving network port information that identifies one or more of the network ports for the traffic flow configuration, and after the instrument port information is received or after the network port information is received, receiving traffic information that identifies one or more network traffic for the traffic flow configuration; and a non-transitory medium configured for storing the instrument port information, the traffic information, and the network port information in association with each other to implement the traffic flow configuration.

Optionally, the traffic flow configuration may prescribe packets from the one or more of the network ports identified by the network port information, and belonging to the one or more network traffic identified in the traffic Information, to be passed to the one or more of the instrument ports identified in the instrument port information.

Optionally, the apparatus may also include a user interface for allowing input of the instrument port information, the network port information, and the traffic information.

Optionally, the user interface may include: an instrument port section that allows input of the instrument port information; a network port section that allows input of the network port information; and a traffic information section that allows input of the traffic information.

Optionally, the instrument port section may include a field for selecting the network switch device from a plurality of network switch devices that are communicatively coupled to each other.

Optionally, the instrument port section may include a field for selecting a slot from a plurality of slots that are associated with the network switch device.

Optionally, the instrument port section may include a field for allowing a user to prescribe one of the one or more instrument ports for communicating with a network device.

Optionally, the network switch device and the network device may be both out-of-band devices.

Optionally, the network port section may include a field for allowing the user to prescribe one of the one or more network ports for communicating with the network device, and wherein the prescribed one of the one or more instrument ports may be for outputting data to the network device, and the prescribed one of the one or more network ports may be for receiving data from the network device.

Optionally, the network device may comprise an ancillary device configured to provide a packet processing function for the network switch device.

Optionally, the network device may comprise another network switch device.

Optionally, the network port section may include a field for allowing a user to prescribe one of the one or more network ports for communicating with a network device.

Optionally, the network switch device and the network device may be both out-of-band devices.

Optionally, the traffic information may include one or more of source information, destination information, bi-directional identifier, traffic type information, VLAN information, UDA information, Layer 2 information, Layer 3 information, Layer 4 information, and traffic filter information.

A computer product includes a non-transitory medium storing instruction, an execution of which causes a method for use to configure a network switch device to implement a traffic flow configuration to be performed, the network switch device having a plurality of network ports and a plurality of instrument ports, the method comprising: receiving instrument port information that identifies one or more of the instrument ports for the traffic flow configuration; receiving network port information that identifies one or more of the network ports for the traffic flow configuration; receiving traffic information that identifies one or more network traffic for the traffic flow configuration, wherein the traffic information is received after the instrument port information is received or after the network port information is received; and storing the instrument port information, the traffic information, and the network port information in association with each other to implement the traffic flow configuration.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

FIG. 5A illustrates a network switch appliance in a stacked configuration with one or more additional network switch appliance(s) in accordance with some embodiments;

FIG. 5B illustrates a network switch appliance in coupled to another network device in accordance with some embodiments;

DESCRIPTION OF THE EMBODIMENTS

Figure 1:
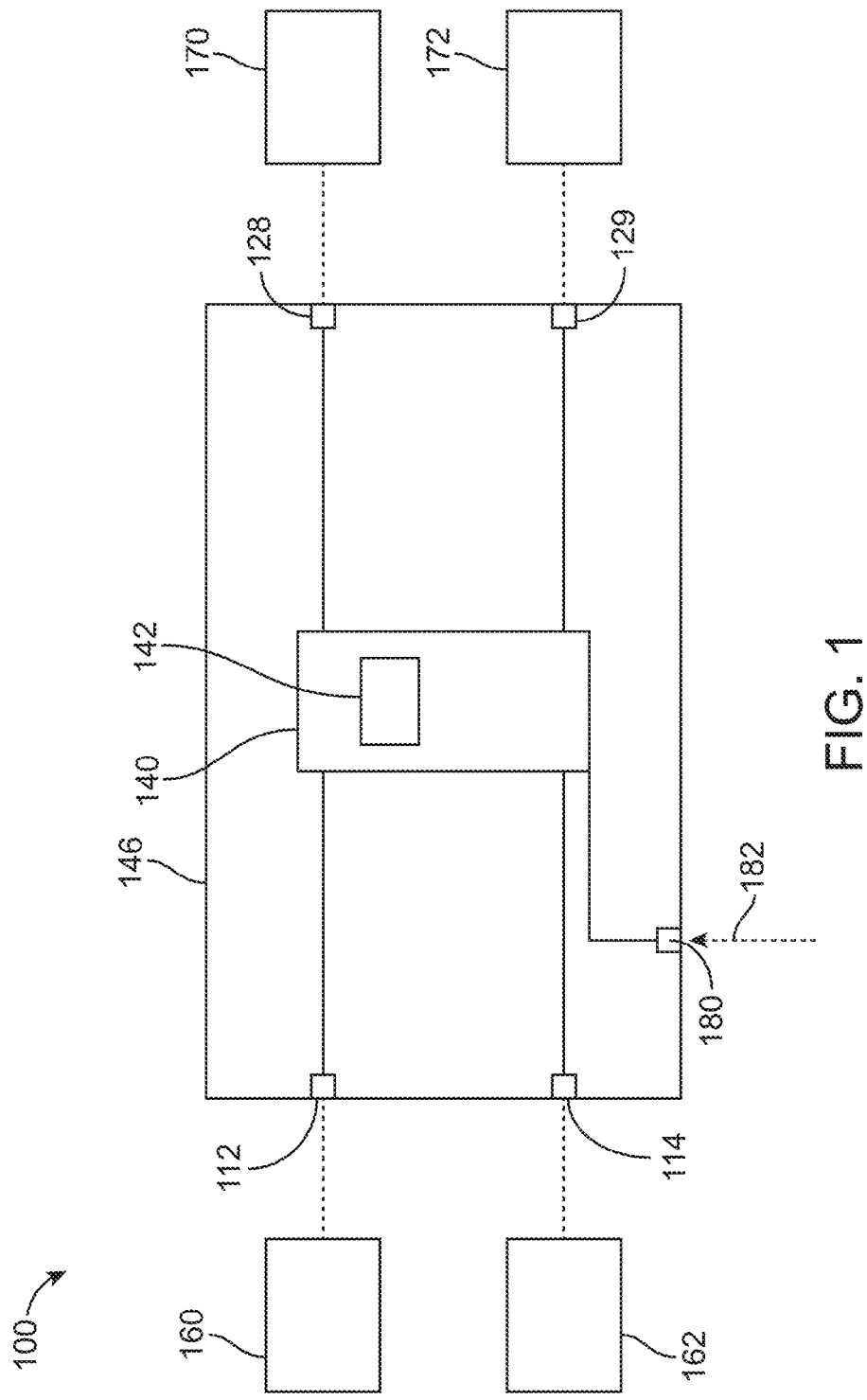
FIG. 1 illustrates a network switch appliance in accordance with some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or not so explicitly described.

FIG. 1 illustrates a network switch appliance/device 100 in accordance with some embodiments. The network switch device 100 includes a first network port 112, a second network port 114, a first instrument port 128, and a second instrument port 129. The device 100 also includes a packet switch (switch module) 140 with a processing unit 142, a processor 144, and a network switch housing 146 for containing the packet switch 140 and the processor 144. In the illustrated embodiments, the device 100 also includes other components, such as a Network PHY (not shown) coupled to each of the respective ports 112, 114, wherein the Network PHYs may be considered to be parts of the packet switch 140. Alternatively, the Network PHYs may be considered to be components that are separate from the integrated circuit 140. The PHY is configured to connect a link layer device to a physical medium such as an optical fiber, copper cable, etc. In other embodiments, instead of the PHY, the device 100 may include an optical transceiver, or a SERDES, etc. The housing 146 allows the device 100 to be carried, transported, sold, and/or operated as a single unit. The ports 112, 114, 128, 129 are located at a periphery of the housing 146. In other embodiments, the ports 112, 114, 128, 129 may be located at other locations relative to the housing 146. Although two network ports 112, 114 are shown, in other embodiments, the device 100 may include more than two network ports. Also, although two instrument ports 128, 129 are shown, in other embodiments, the device 100 may include only one instrument port, or more than two instrument ports.

During use, the first network port 112 of the device 100 is communicatively coupled (e.g., via a network, such as the Internet) to a first node 160, and the second network port 114 is communicatively coupled (e.g., via a network, such as the Internet) to a second node 162. In some embodiments, the device 100 is configured to receive packets from nodes 160, 162 via the network ports 112, 114. Alternatively, or additionally, the device 100 may be configured to communicate packets between the first and second nodes 160, 162 via the network ports 112, 114. Also, during use, the instrument ports 128, 129 of the device 100 are communicatively coupled to respective instruments 170, 172. The instruments 170, 172 may be directly coupled to the device 100, or communicatively coupled to the device 100 through the network (e.g., Internet). In some cases, the device 100 is provided as a single unit that allows the device 100 to be deployed at a single point along a communication path. In the illustrated embodiments, the packet switch 140 is configured to receive packets from nodes 160, 162 via the network ports 112, 114, and process the packets in accordance with a predefined scheme. For example, the packet switch 140 may pass packets received from one or more nodes to one or more instruments that are connected to respective instrument port(s) 128, 129. In some embodiments, one or more of the network ports 112, 114 may be configured to receive normal packets (e.g., packets not from a virtualized network), as well as virtualized packets (e.g., packets with tunnel format that includes encapsulation of the original packets resulted from virtualization technology). In other embodiments, one or more the network ports 112, 114 may be configured to receive only non-virtualized packets. In further embodiments, one or more the network ports 112, 114 may be configured to receive only virtualized packets.

In one or more embodiments, the packet switch 140 may be any switch module that provides packet transmission in accordance with a pre-determined transmission scheme. In some embodiments, the packet switch 140 may be user-configurable such that packets may be transmitted in a one-to-one configuration (i.e., from one network port to an instrument port). As used in this specification, the term "instrument port" refers to any port that is configured to transmit packets to an instrument, wherein the instrument may be a non-pass through device (i.e., it can only receive packets intended to be communicated between two nodes, and cannot transmit such packets downstream), such as a sniffer, a network monitoring system, an application monitoring system, an intrusion detection system, a forensic storage system, an application security system, etc., or the instrument may be a pass-through device (i.e., it can receive packets, and transmit the packets back to the device 100 after the packets have been processed), such as an intrusion prevention system. In other embodiments, the packet switch 140 may be configured such that the packets may be transmitted in a one-to-many configuration (i.e., from one network port to multiple instrument ports). In other embodiments, the packet switch 140 may be configured such that the packets may be transmitted in a many-to-many configuration (i.e., from multiple network ports to multiple instrument ports). In further embodiments, the packet switch 140 may be configured such that the packets may be transmitted in a many-to-one configuration (i.e., from multiple network ports to one instrument port). In some embodiments, the one-to-one, one-to-many, many-to-many, and many-to-one configurations are all available for allowing a user to selectively configure the device 100 so that the packets (or certain types of packets) are routed according to any one of these configurations. In some embodiments, the packet movement configuration is predetermined such that when the device 100 receives the packets, the device 100 will automatically forward the packets to the ports based on the predetermined packet movement configuration (e.g., one-to-one, one-to-many, many-to-many, and many-to-one) without the need to analyze the packets (e.g., without the need to examine the header, determine the type of packets, etc.).

Examples of packet switch 140 that may be used to implement features described herein include any of the commercially available network switch devices, such as GigaVUE™, that is available at Gigamon LLC. Other examples of packet switch 140 that may be used to implement features described herein are described in U.S. patent application Ser. Nos. 12/148,481, 12/255,561, 11/123,273, 11/123,465, and 11/123,377, the entire disclosure of all of which is expressly incorporated by reference herein.

In accordance with some embodiments, the packet switch 140 may have the functionalities of a conventional packet switch except that it provides visibility into various parts of a network. Thus, embodiments of the packet switch 140 may operate like a conventional managed packet switch, but providing packet monitoring function. This is accomplished by configuring the packet switch 140 to operate as a circuit switch under certain circumstances. In some embodiments, the configuring of the managed packet switch may be performed by utilizing a CPU interface of the switch to modify appropriate registers in the switch to allow for the desired operation. Also, in some embodiments, the packet switch 140 may be an "out-of-band" network switch, which is configured to obtain packets and pass them to an instrument or to a network that is different from that associated with the original intended destination of the packets.

It should be noted that the packet switch 140 that may be used with the device 100 is not limited to the examples described above, and that other packet switches 140 with different configurations may be used as well. Also, in one or more embodiments described herein, the packet switch 140 may be implemented using an integrated circuit, such as a processor (e.g., a general purpose processor, a network processor, an ASIC processor, a FPGA processor, etc.). Thus, the term "packet switch" or "switch module" may refer to any circuit that is capable of performing the functions described herein, and should not be limited to a switch or a processor.

In other embodiments, the network device 100 may optionally include an additional processing unit (e.g., a processor) communicatively coupled to the processing unit 142. The additional processing unit may be used to perform additional packet processing, such as header stripping, in some embodiments. For example, in some embodiments, the additional processing unit may be configured to receive only packets with a tunnel format, such as that used in a virtualized network. In one implementation, the processing unit 142 or the packet switch 140 is configured to pass all packets with a tunnel format to the additional processing unit, and does not pass packets without any tunnel format (e.g., packets that are not associated with a virtualized network) to the additional processing unit. Upon receiving a packet with a tunnel format, the additional processing unit then removes one or more headers from the packet. By means of non-limiting examples, the additional processing unit may be configured to remove an outer MAC header, an outer IP header, an outer UDP header, or any combination of the foregoing, from the packet. In some embodiments, after the additional processing unit performs header stripping on the packet, the additional processing unit then passes the packet back to the packet switch 140. The packet switch 140 then transmits the packet to one or more of the instrument ports 128, 129 according to a predetermined transmission scheme (e.g., one-to-one, one-to-many, many-to-one, many-to-many, etc.) as discussed previously. In other embodiments, in addition to performing packet stripping, the additional processing unit may also be configured to perform other packet processing functions on the received packet. In some embodiments, the additional processing unit may be located outside the housing of the network device 100. In other embodiments, the additional processing unit may be a part of the packet switch 140. For example, the additional processing unit may be considered to be a part of the processing unit 142. Also, in some embodiments, the additional processing unit may be a general purpose processor, a network processor, an ASIC processor, a FPGA processor, or any of other types of processor. In other embodiments, the additional processing unit may be any hardware, software, or combination thereof.

In the illustrated embodiments, the processing unit 142 is illustrated as a component of the packet switch 140. In other embodiments, the processing unit 142 may be a separate component from the packet switch 140. The processing unit 142 may be implemented using a processor, such as a general processor, a network processor, an ASIC processor, a FPGA processor, etc. In other embodiments, the processing unit 142 may be a field processor. In further embodiments, the processing unit 142 may be a network card. Also, in some embodiments, the packet switch 140 may include ternary content-addressable memory (TCAM). The packet switch 140 may be configured to perform various packet processing functions, included but not limited to packet filtering, packet routing, packet switching, packet mirroring, packet aggregation, etc.

As shown in the figure, the network switch device 100 further includes a port 180 for receiving configuration information 182 to thereby configure the packet switch 140 (e.g., the processing unit 142 in the packet switch). In some embodiments, the port 180 may be a separate and different port from the network ports 112, 114. In other embodiments, the port 180 may be a network port, like the network ports 112, 114, or may be implemented using one or both of the network ports 112, 114. In such cases, in addition to receiving the information 182, the port 180 may also receive network traffic that are being communicated between nodes (e.g., nodes 160, 162). Also, in further embodiments, the device 100 may include multiple ports 180 for receiving configuration information 182. In some cases, one or more of the ports 180 may be used to implement the network ports 112, 114, thereby allowing the same port(s) 180 for receiving the configuration information 182 to also receive network traffic.

Figure 2A:
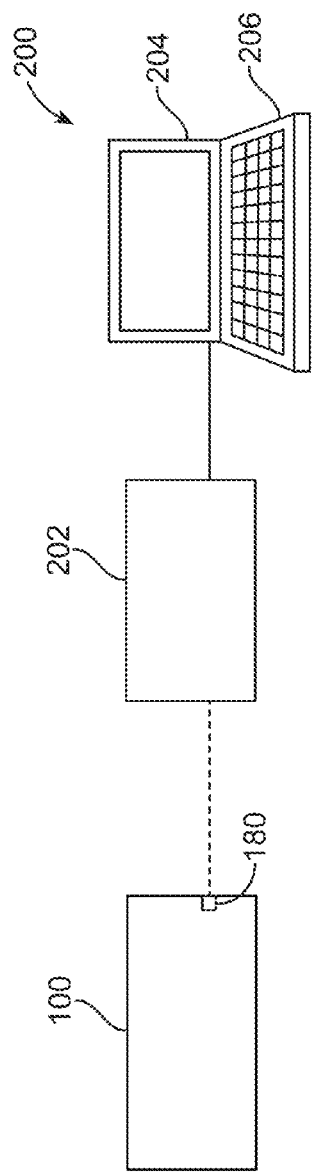
FIG. 2A illustrates an apparatus for configuring the network switch appliance of FIG. 1 in accordance with some embodiments.
Figure 2B:
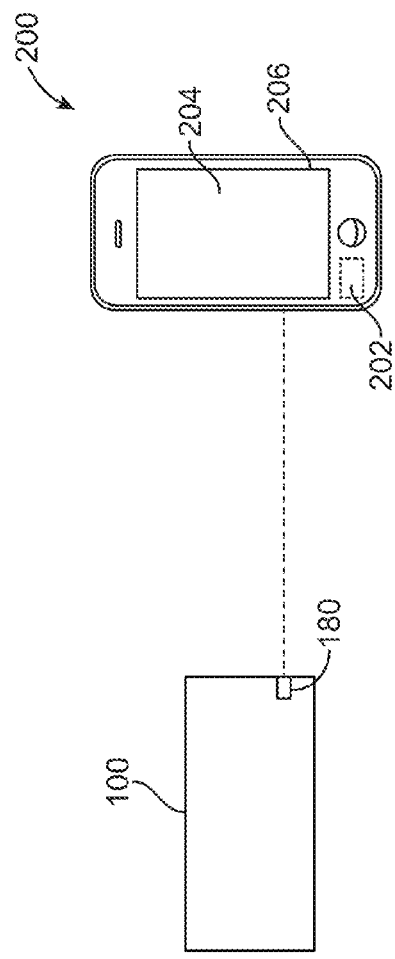
FIG. 2B illustrates another apparatus for configuring the network switch appliance of FIG. 1 in accordance with other embodiments.

FIG. 2A illustrates an apparatus 200 for configuring the network switch device 100 in accordance with some embodiments. The apparatus 200 includes a processing unit 202, a screen 204 for displaying information, and an input device 206 for allowing a user of the apparatus 200 to enter information. In some embodiments, the apparatus 200 may be implemented using a computer, such as a desktop or a laptop. In other embodiments, the apparatus 200 may be implemented using a phone (FIG. 2B), such as an iPhone, a smart phone, etc. In still further embodiments, the apparatus 200 may be implemented using other types of handheld devices, such as an iPad, a tablet, an emailing device, etc.

During use, the apparatus 200 is communicatively coupled to the network device 100 through the port 180. For example, the apparatus 200 may be directly and physically coupled to the network device 100 through a cable. In other embodiments, the apparatus 200 may be communicatively coupled to the network device 100 through a network, such as the Internet. In further embodiments, the network device 100 may optionally include a transceiver for receiving and transmitting information wirelessly. In such cases, the apparatus 200 may be communicatively coupled to the network device 100 through a wireless network.

In some embodiments, the processing unit 202 is configured to provide a graphical user interface for display on the screen 204, wherein the user of the apparatus 200 may use the graphical user interface to input information for configuring the network switch device 100. For example, the user may user the graphical user interface to configure the network switch device 100 so that a traffic flow configuration may be implemented.

In further embodiments, the processing unit 202 may be a part of a server, which communicates with the network switch device 100, and an input device that includes the screen 204 and the input device 206. In such cases, the processing unit 202 may receive input (command, program instruction, configuration data, etc.) from the input device, and may transmit configuration data to configure the network switch device 100. The processing unit 202 may receive the information from the input device wirelessly, through a network such as the Internet, or directly through a cable. Similarly, the processing unit 202 may transmit the information to the network switch device 100 wirelessly, through a network such as the Internet, or directly through a cable.

Figure 3:
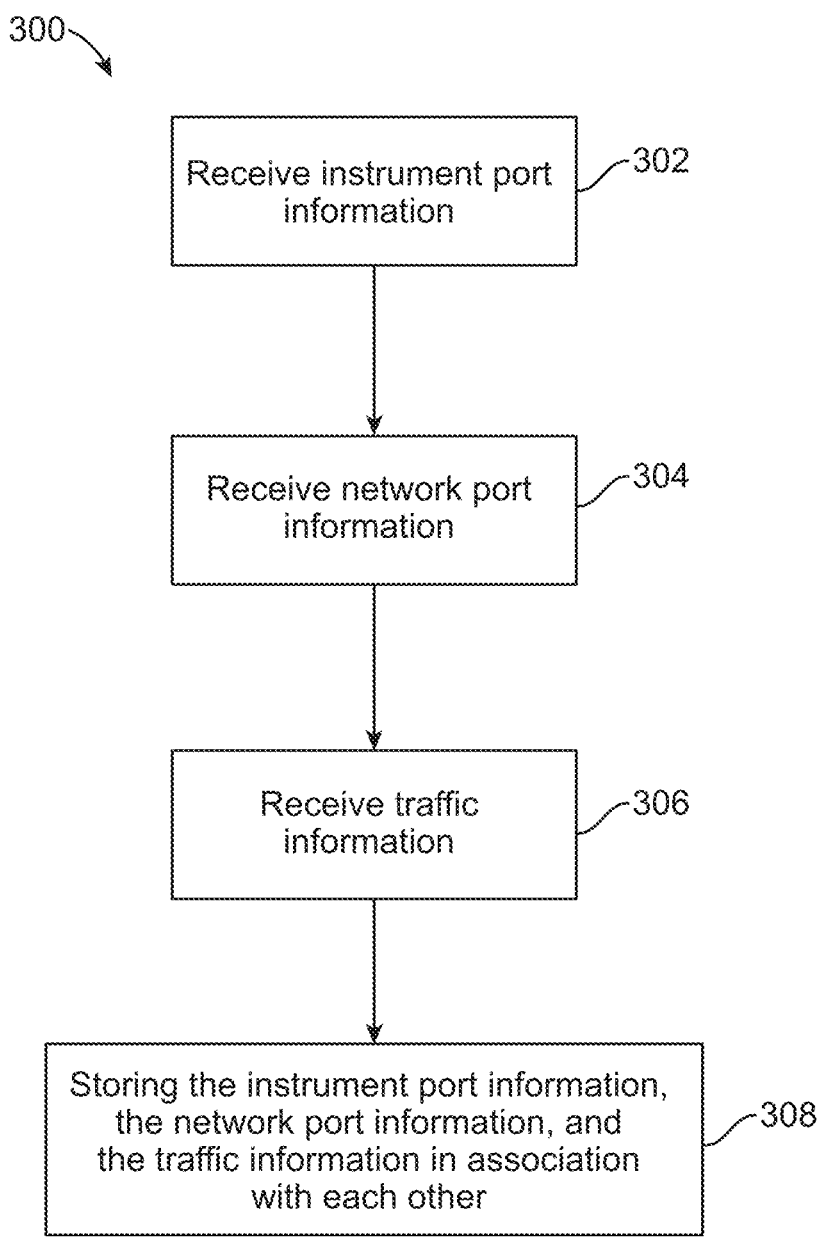
FIG. 3 illustrates a method performed by the apparatus of FIG. 2 for configuring a network switch appliance in accordance with some embodiments.

As shown in FIG. 3, in some embodiments, the apparatus 200 may be used in a method 300 to configure the network switch device 100 to implement a traffic flow configuration. As used in this specification, the term "traffic flow configuration" may refer to any manner in which a packet may be passed downstream in the network switch device 100. The method 300 includes receiving instrument port information that identifies one or more of the instrument ports for the traffic flow configuration (item 302). Such may be performed by the processing unit 202 receiving instrument port information that identifies one or more instrument ports (e.g., instrument ports 128, 129) input by the user of the apparatus 200. The method 300 also includes receiving network port information that identifies one or more of the network ports for the traffic flow configuration (item 304). Such may be performed by the processing unit 202 receiving network port information that identifies one or more network ports (e.g., network ports 112, 114) input by the user of the apparatus 200. The method 300 also includes receiving traffic information that identifies one or more network traffic for the traffic flow configuration (item 306). Such may be performed by the processing unit 202 receiving traffic information input by the user of the apparatus 200. The method 300 further includes storing the instrument port information, the traffic information, and the network port information in association with each other to implement the traffic flow configuration (item 308). In some embodiments, such may be performed by the processing unit 202 that stores the instrument port information, the traffic information, and the network port information in a non-transitory that is a part of the processing unit 202, or that is communicatively coupled to the processing unit 202. In other embodiments, item 306 may be performed by the processing unit 142 of the network device 100, which stores the instrument port information, the traffic information, and the network port information in a non-transitory that is a part of the processing unit 142, or that is communicatively coupled to the processing unit 142 (wherein the non-transitory medium may be inside the network device 100, or outside the network device 100). In further embodiments, the act of storing the instrument port information, the traffic information, and the network port information may be performed by the non-transitory medium. In some embodiments, the traffic flow configuration (implemented using the instrument port information, the traffic information, and the network port information) may prescribe packets from the one or more of the network ports of the network switch device identified by the network port information, and belonging to the one or more network traffic identified in the traffic Information, to be passed to the one or more of the instrument ports of the network switch device 100 identified in the instrument port information.

Figure 4A:
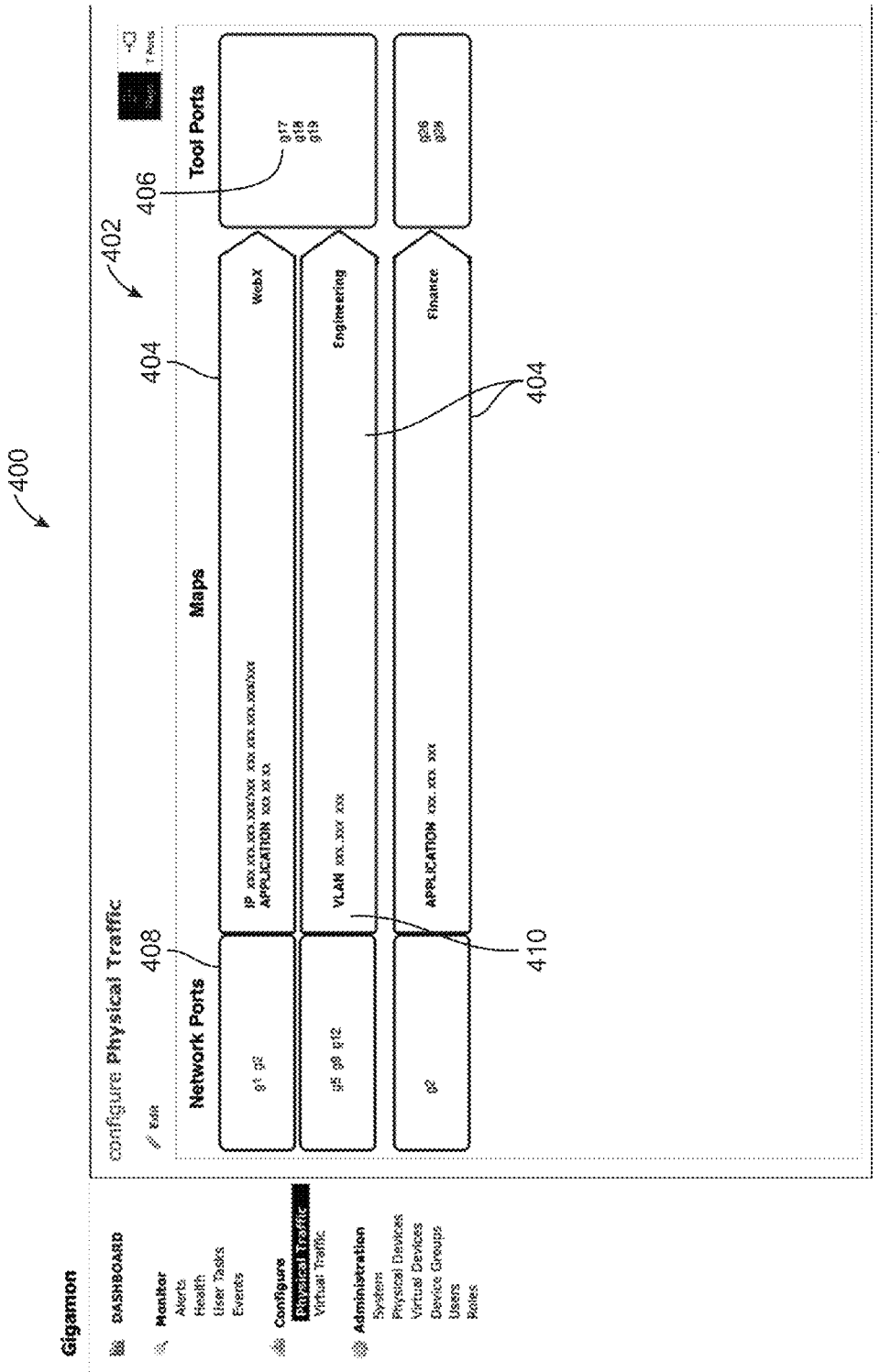
FIGS. 4A-4Q illustrates a user interface for configuring a network switch appliance in accordance with some embodiments.

As discussed, the processing unit 202 of the apparatus 200 may receive instrument port information, traffic information, and network port information that are input by a user of the apparatus 200. In some embodiments, the processing unit 202 is configured to provide a user interface for allowing the instrument port information, traffic information, and network port information to be entered by a user. FIGS. 4A-4T illustrate a graphical user interface 400 that may be provided by the processing unit 202 for display on the screen 204 in accordance with some embodiments. For example, the processing unit 202 may generates the various features of the graphical user interface 400 by executing program instructions stored in the processing unit 202.

As shown in FIG. 4A, the user interface 400 may display a list 402 of maps 404 that have already been created previously for the network device 100. Each map 404 associates certain network port(s) of the network switch device 100 with certain instrument port(s) of the network switch device 100 in accordance with certain packet filtering requirement(s). For example, as shown in the figure, under the map "Engineering" 404, packets that has certain VLAN value received from network ports g5, g9, g12 will be forwarded to the instrument ports g17, g18, g19 of the network switch device 100. In some embodiments, the information in the list 402 may be stored in the network device 100, and may be retrieved by the apparatus 200. In other embodiments, the information in the list 402 may be stored in a non-transitory medium that is in the apparatus 200 or that is communicatively coupled to the apparatus 200. As shown in the figure, each map 404 has instrument port information 406, network port information 408, and traffic information 410 associated therewith. For example, in the illustrated example, the map 404 "Engineering" involves instrument ports g17-g19, network ports g5, g9, and g12, and network traffic that satisfies certain VLAN criteria. Also, map 404 "Finance" involves instrument ports g26 and g28, network ports g22 and g23, and network traffic that satisfies certain application requirements. In some embodiments, when the map 404 "Finance" is applied to the network device 100, the network device 100 will process packets received at network ports with identifiers g22, g23 according to the map rule(s) of the Finance map 404. For example, if packets received at network port g22 or g23 satisfy the application criteria prescribed by the traffic information 410 of the map 404, the network device 100 will then forward the packets to instrument ports g26 and g28.

Figure 4B:
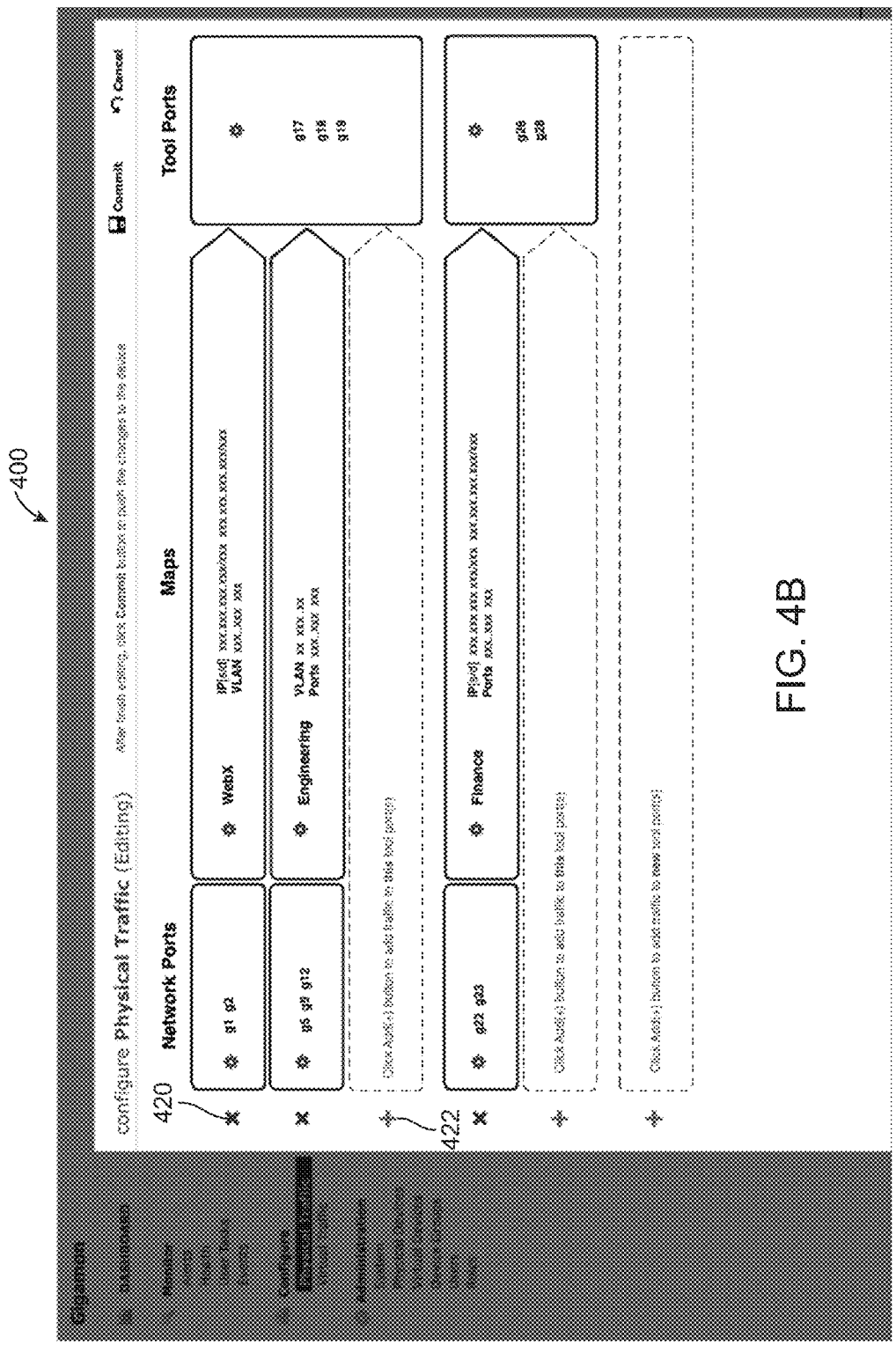

In some embodiments, the user interface 400 may allow a user to delete a map 404 or to add a new map 404. For example, as shown in FIG. 4B, the user interface 400 may display a graphic 420 for allowing a user to delete a map 404, and a graphic 422 for allowing a user to add a map 404.

Also, in some embodiments, the instrument port information 406, the network port information 408, and the traffic information 410 in each map 404 presented in the user interface 400 may be editable.

Figure 4C:
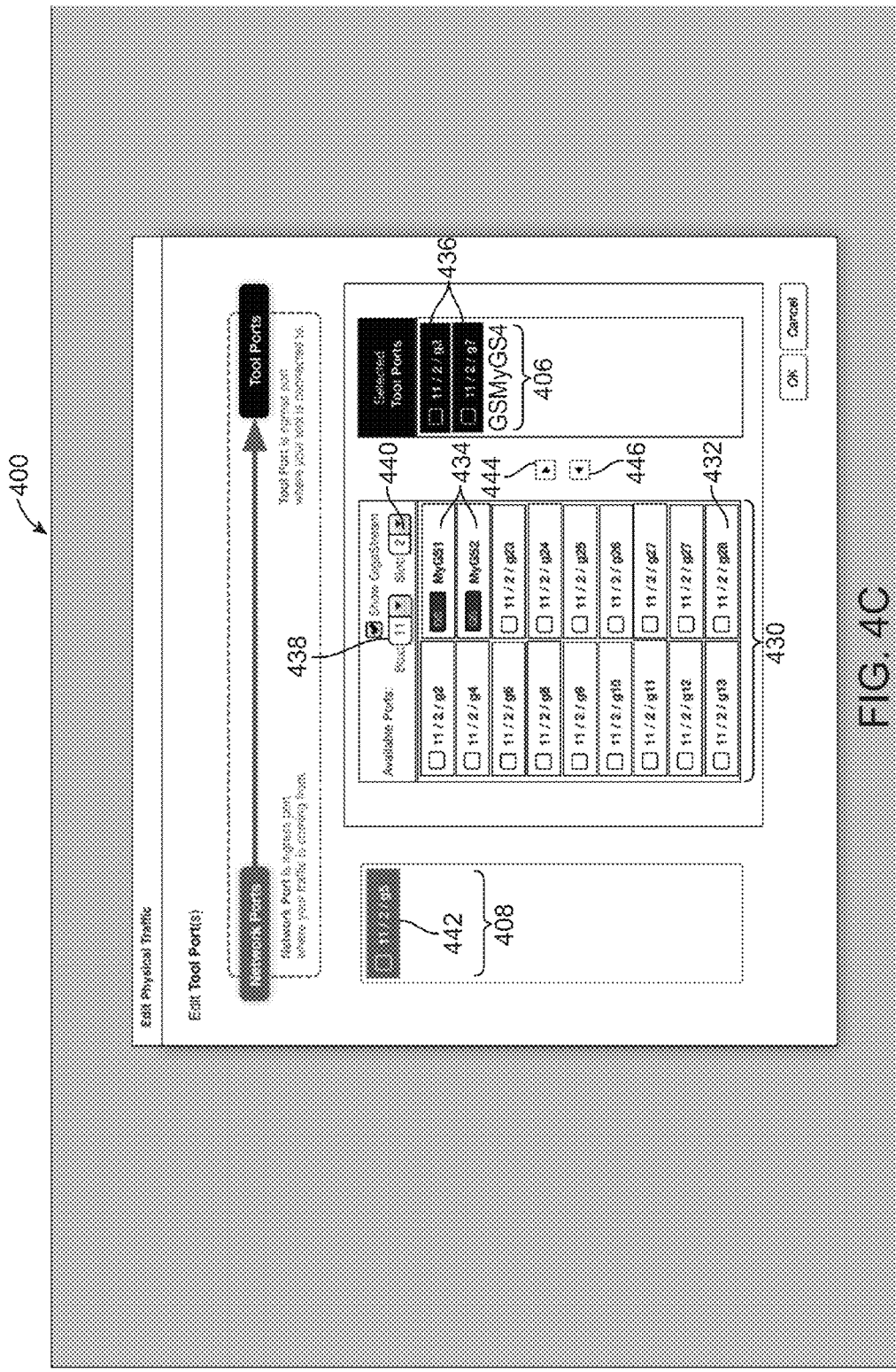

For example, in some embodiments, the user of the user interface 400 may choose to edit the instrument port(s) for a particular map 404. In such cases, the user interface 400 may display graphics for allowing the user to input instrument port information 406. For example, as shown in FIG. 4C, the user interface 400 may display a list 430 of all available ports 432 for the user to choose. As shown in the figure, when a port 432 is selected to be an instrument port from the list 430 (e.g., by using the assign button 444), the port identifier becomes an instrument port identifier 436 displayed under the instrument port information 406. In some cases, one or more of the instrument port identifier 436 may be un-assigned by using the un-assign button 446. In the illustrated example, the available ports 432 are organized in the list 430 according to Box number 438, and slot number 440. In particular, each of the identifier for the available port 432 includes "11/2/" indicating that the available port 432 belongs to Box number "11", and Slot number "2". The box number represents an identifier of a device. For example, in some embodiments, there may be multiple devices 100 that are stacked (communicatively linked) together. In such cases, the box number may be used to select one of the devices 100. The slot number indicates the corresponding slot in the device 100 for accepting a processing card. In some embodiments, the user of the interface 400 may select a different Box number 438 and a different Slot number 440 to cause a corresponding set of available ports 432 be displayed in the list 430. As shown in FIG. 4C, the user interface 400 may also display the network port identifier(s) 442 for the network ports that have been assigned for the map 404 being edited. In the illustrated example, the network port with identifier 442 "g5" is associated with the instrument ports g3, g7 under the map 404 being edited.

In the illustrated example, in addition to available ports, the list 430 may also optionally include device identifiers 434. When the device identifier 434 is selected, the device identifier 434 ("GS MyGS4" in the example) will be included in the instrument port information 406. That means packets will be forwarded to the device with the device identifier 434 "GS MyGS4". Such feature is advantageous for creating map 404 to be utilized in a plurality of network switch devices that are stacked together.

FIG. 5A illustrates an example of a stacked configuration in which multiple network switch devices 100a-100b are stacked together. Network switch device 100a is communicatively coupled to a network monitoring instrument 170a, and nodes 160a, 160b. Network switch device 100b is communicatively coupled to a network monitoring instrument 170b, and node 160c. Network switch device 100c is communicatively coupled to network monitoring instruments 170c, 170d, and node 160d. Assuming the above map 404 involving "GS MyGS4" as instrument port is being processed by the network switch device 100b, when the network switch device 100b received packets that satisfy certain criteria, such packets will be passed according to the map 404 to the instrument port that is communicating with the network switch device 100c "GS MyGS4".

It should be noted that selecting a device identifier as an instrument port may be applicable for defining a map 404 to be utilized in other devices configuration that is different from that shown in FIG. 5A. For example, in other embodiments, the above feature may be used to define a map 404 to be utilized in a network switch device 100 having an ancillary device 101 coupled thereto (FIG. 5B). The ancillary device 101 may be configured to perform additional packet processing functions for supporting the network switch device 100. In the illustrated example, the device identifier "GS MyGS4" has been assigned to be an instrument port in a map 404 being processed by the device 100. Accordingly, when the network switch device 100 receives packets that satisfy certain criteria, such packets will be passed according to the map 404 to the instrument port that is communicating with the ancillary device 101 "GS MyGS4".

Figure 4D:
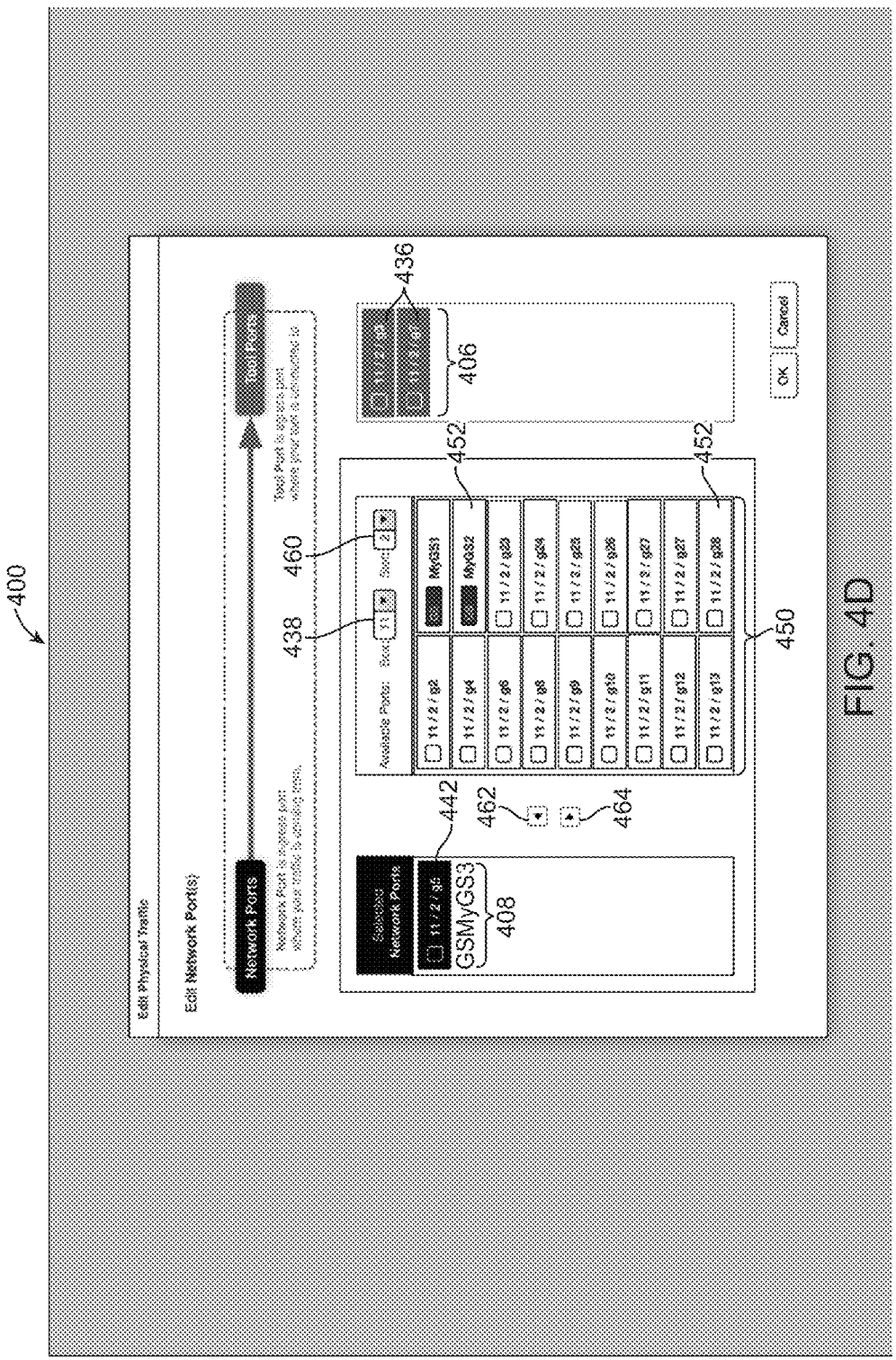

In other embodiments, the user of the user interface 400 may choose to edit the network port(s) for a particular map 404. In such cases, the user interface 400 may display graphics for allowing the user to input network port information 408. For example, as shown in FIG. 4D, the user interface 400 may display a list 450 of all available ports 452 for the user to choose to be network port(s). As shown in the figure, when a port 452 is selected to be a network port from the list 450 (e.g., using the assign button 462), the port identifier becomes a network port identifier 442 displayed under the network port information 408. In some cases, one or more of the network port identifier 442 may be un-assigned by using the un-assign button 464. In the illustrated example, the available ports 452 are organized in the list 450 according to Box number 458, and slot number 460. In particular, each of the identifier for the available port 452 includes "11/2/" indicating that the available port 452 belongs to Box number "11", and Slot number "2". In some embodiments, the user of the interface 400 may select a different Box number 458 and a different Slot number 460 to cause a corresponding set of available ports 452 be displayed in the list 450. In some embodiments, the list 450 of available ports for the user to select as network ports may be the same as the list 430 of available ports. In such cases, the list 430/450 displays all available ports, wherein one or more of the available ports may be selectively configured to be network port(s) or instrument port(s). In other embodiments, the list 450 of available ports for selection as network ports may be different from the list 430 of available ports for selection as instrument ports. As shown in FIG. 4D, the user interface 400 may also display the instrument port identifier(s) 436 for the instrument ports that have been assigned for the map 404 being edited. In the illustrated example, the instrument ports with identifiers 436 "g3" and "g7" are associated with the network port g5 under the map 404 being edited.

Also, in some embodiments, in addition to available ports, the list 450 may also optionally include device identifiers (like the device identifiers 434 described with reference to FIG. 4C). When the device identifier is selected ("GS MyGS3" in the example of FIG. 4D), the device identifier will be included in the network port information 408. That means packets will be received by the network switch device 100 from the device with the device identifier "GS MyGS3". Such feature is advantageous for creating map 404 to be utilized in a plurality of network switch devices that are stacked together. Following the above example of FIG. 5A (illustrating stacked network switch devices 100a-100b), and assuming the above map 404 involving "GS MyGS3" as network port is being processed by the network switch device 100b, the network switch device 100b will receive packets from the network switch device 100a "GS MyGS3", and will process the received packets according to the map 404.

It should be noted that selecting a device identifier as a network port may be applicable for defining a map 404 to be utilized in other devices configuration that is different from that shown in FIG. 5A. For example, in other embodiments, the above feature may be used to define a map 404 to be utilized in a network switch device 100 having an ancillary device 101 coupled thereto (FIG. 5B). The ancillary device 101 may be configured to perform additional packet processing functions for supporting the network switch device 100. In the illustrated example, the device identifier "GS MyGS4" has been assigned to be a network port in a map 404 being processed by the device 100. Accordingly, the network switch device 100 will receive packets from the ancillary device 101 "GS MyGS4", and will process the received packets according to the map 404.

Figure 4E:
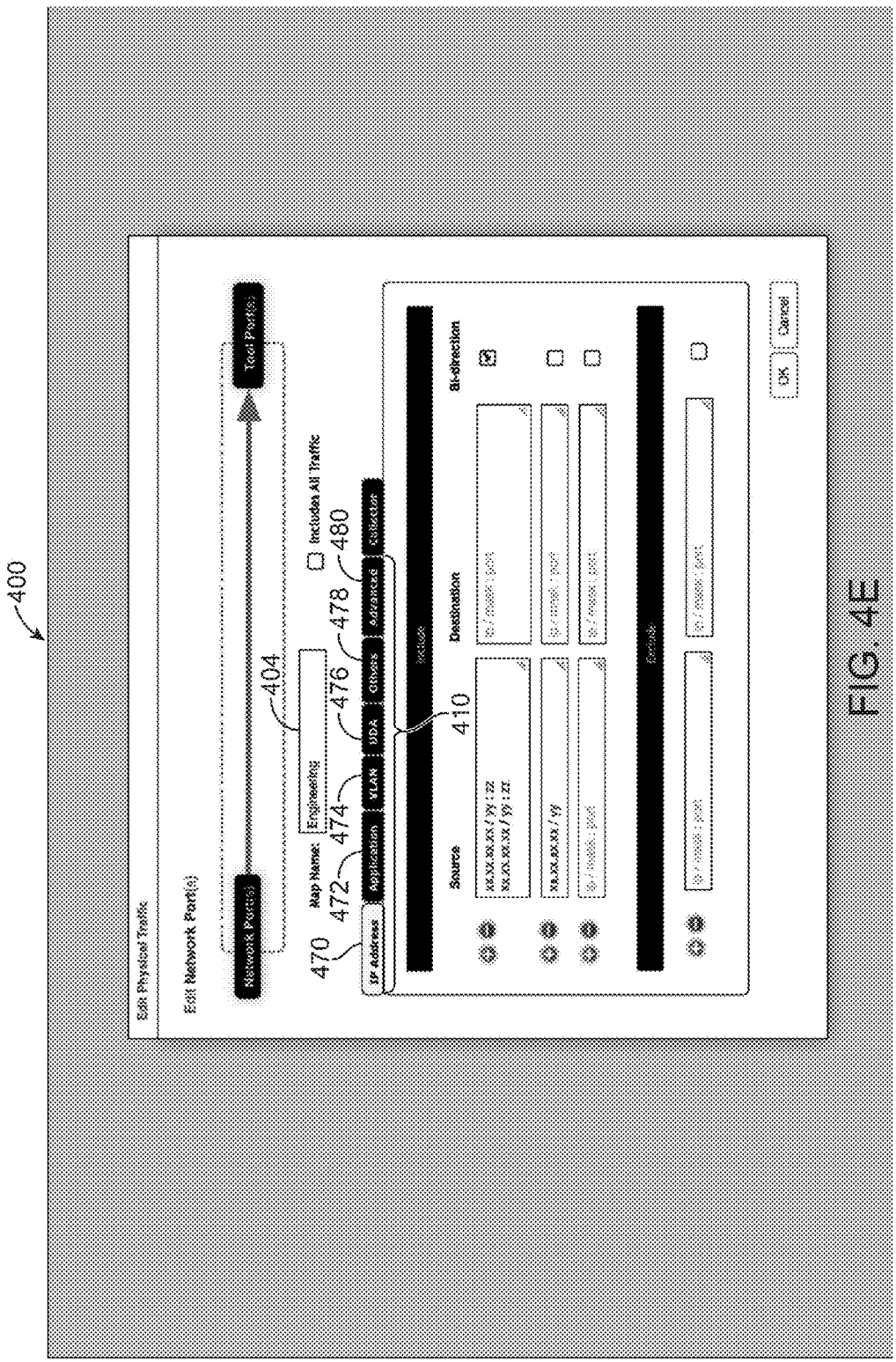

In other embodiments, the user of the user interface 400 may choose to edit the traffic information 410 for a particular map 404. In such cases, the user interface 400 may display graphics for allowing the user to input traffic information 410. For example, as shown in FIG. 4E, the user interface 400 may provide an "IP Address" tab/section 470 for allowing user to access IP address information in a map 404, an "Application" tab/section 472 for allowing user to access application information in the map 404, "VLAN" tab/section 474 for allowing user to access VLAN information in the map 404, "UDA" tab/section 476 for allowing user to access UDA information in the map 404, "Others" tab/section 478 for allowing user to access other traffic configuration information in the map 404, and "Advanced" tab/section 480 for allowing user to access advance traffic configuration information in the map (wherein each of the above information may be considered as an example of traffic information 410). The user may edit any of the traffic information under the tabs/sections 470-478 using the user interface 400. The information under the tabs/sections 470-478 will be described in further detail with reference to FIGS. 4H-4O.

In the above embodiments, the user interface 400 has been described as allowing a user to edit an existing map 404 that was already created. In some embodiments, the user interface 400 may present graphics for allowing a user of the user interface 400 to create a new map 404. In such cases, the user interface 400 map provide an instrument port section, a network port section, and a traffic information section, for allowing a user to input instrument port information, network port information, and traffic information for defining a new map 404. Any of the instrument port section, the network port section, and the traffic information section may be a window, a field, a graphic that occupies certain area within the display screen, etc.

Figure 4F:
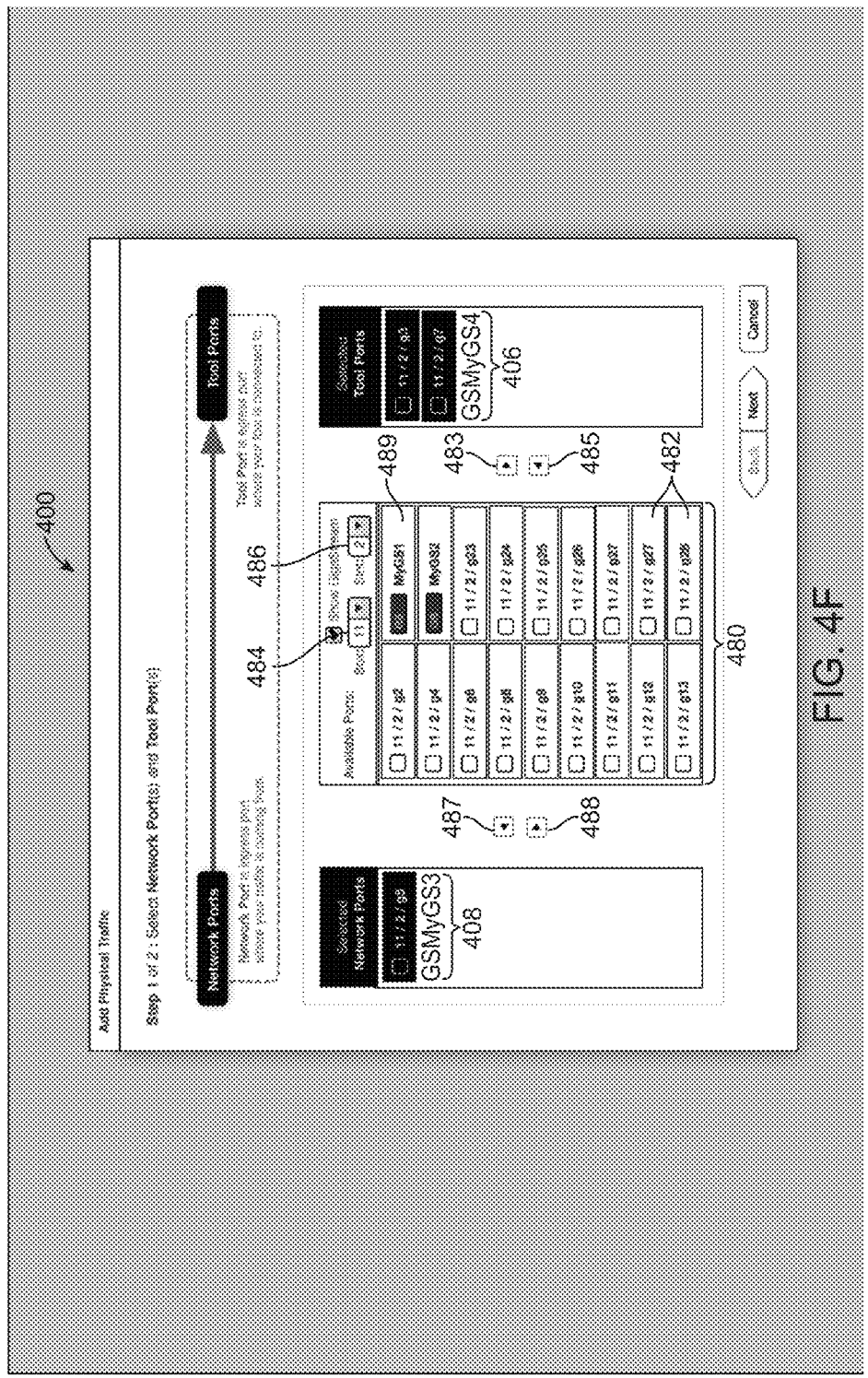

For example, as shown in FIG. 4F, the user interface 400 may provide a list 480 of all available ports 482 for the user to choose. As shown in the figure, when a port 482 is selected to be an instrument port from the list 480 (e.g., by using the assign button 483), the port identifier becomes an instrument port identifier displayed under the instrument port information 406. In some cases, one or more of the instrument port identifier may be un-assigned by using the un-assign button 485. In the illustrated example, the available ports 482 are organized in the list 480 according to Box number 484, and slot number 486. In particular, each of the identifier for the available port 482 includes "11/2/" indicating that the available port 482 belongs to Box number "11", and Slot number "2". In some embodiments, the user of the interface 400 may select a different Box number 484 and a different Slot number 486 to cause a corresponding set of available ports 482 be displayed in the list 480.

Also, as shown in FIG. 4F, when a port 480 is selected to be a network port from the list 480 (e.g., using the assign button 487), the port identifier becomes a network port identifier displayed under the network port information 408. In some cases, one or more of the network port identifier may be un-assigned by using the un-assign button 488.

Also, in some embodiments, in addition to the available ports, the list 480 may also optionally include device identifiers 489. When the device identifier 489 ("GS MyGS4" in the example) is selected to be an instrument port using the assign button 483, the device identifier 489 "GS MyGS4" will be included in the instrument port information 406. That means packets will be forwarded from the network switch device 100 to the device with identifier "GS MyGS4". Such feature is advantageous for creating map 404 to be utilized in a plurality of network switch devices that are stacked together. For example, as similarly discussed with reference to FIG. 5A, which illustrates an example of a stacked configuration in which multiple network switch devices 100a-100b are stacked together, the above map 404 involving "GS MyGS4" as instrument port may be processed by the network switch device 100b. When the network switch device 100b received packets that satisfy certain criteria, such packets will be passed according to the map 404 to the instrument port that is communicating with the network switch device 100c "GS MyGS4". Also, in other embodiments, the above feature may be used to define a map 404 to be utilized in a network switch device 100 having an ancillary device 101 coupled thereto (as similarly discussed with reference to FIG. 5B). The ancillary device 101 may be configured to perform additional packet processing functions for supporting the network switch device 100. In the illustrated example of FIG. 5B, the device identifier "GS MyGS4" has been assigned to be an instrument port in a map 404 being processed by the device 100. Accordingly, when the network switch device 100 receives packets that satisfy certain criteria, such packets will be passed according to the map 404 to the instrument port that is communicating with the ancillary device 101 "GS MyGS4".

Returning to FIG. 4F, alternatively, when the device identifier 489 ("GS MyGS3" in the example) is selected to be a network port using the assign button 487, the device identifier 489 "GS MyGS3" will be included in the network port information 408. That means packets will be received by the network switch device 100 from the device with the device identifier "GS MyGS3". Such feature is advantageous for creating map 404 to be utilized in a plurality of network switch devices that are stacked together. Following the above example of FIG. 5A (illustrating stacked network switch devices 100a-100b), and assuming the above map 404 involving "GS MyGS3" as network port is being processed by the network switch device 100b, the network switch device 100b will receive packets from the network switch device 100a "GS MyGS3", and will process the received packets according to the map 404. Also, in other embodiments, the above feature may be used to define a map 404 to be utilized in a network switch device 100 having an ancillary device 101 coupled thereto (FIG. 5B). The ancillary device 101 may be configured to perform additional packet processing functions for supporting the network switch device 100. In the illustrated example, the device identifier "GS MyGS4" has been assigned to be a network port in a map 404 being processed by the device 100. Accordingly, the network switch device 100 will receive packets from the ancillary device 101 "GS MyGS4", and will process the received packets according to the map 404.

Returning to FIG. 4F, in some embodiments, the list 480 of available ports for selection as instrument ports and network ports may be the same as the list 430 or the list 450. In other embodiments, the list 480 may be different from the list 430 and the list 450. For example, in other embodiments, the list 480 may be a superset of the list 430 or the superset of the list 450.

In the above embodiments, the user interface 400 allows the user to selectively enter the instrument port information 406, and the network port information 408 in any order. In other embodiments, the user interface 400 may require the user to enter the instrument port information 406 first for a certain map 404, and then allow the user to enter the network port information 408 only after the instrument port information 406 has been entered. For example, as shown in FIG. 4G, the user of the user interface 400 has selected ports g3, g7 as instrument ports, which appear under the instrument port information 406. The user interface 400 then presents assign button 487, and unassign button 488, for allowing the user to select port(s) as network port(s).

In further embodiments, the user interface 400 may require the user to enter the network port information 408 first for a certain map 404, and then allow the user to enter the instrument port information 406 only after the network port information 408 has been entered.

In addition to allowing user to input instrument port information and network port information for a particular map 404, the user interface 400 may also present graphics for allowing a user to input traffic information for the map 404. FIGS. 4H-4O illustrates different traffic information 410 that may be input by a user to create a map 404 that filters packets received from instrument port(s) to one or more instrument port(s). As shown in FIG. 4H, the user interface 400 may display different IP address fields under the "IP Address" tab 470 for allowing the user to input source address(es) and/or destination address(es), and the user may prescribe whether network traffic with certain source address and/or destination address is to be excluded or included for forwarding downstream to instrument port(s) of the network switch device 100 according to the map 404.

Figure 4I:
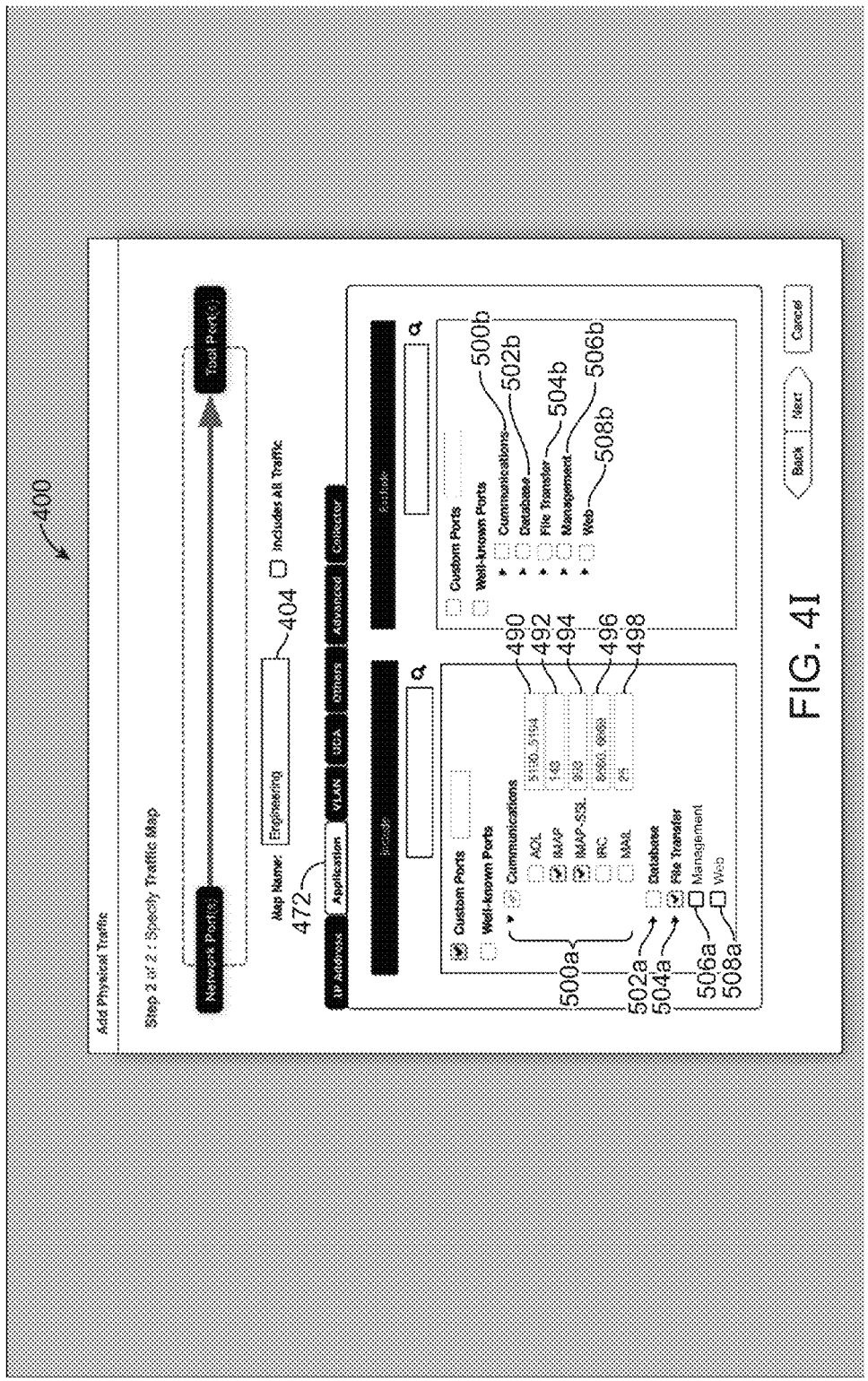

As shown in FIG. 4I, the user interface 400 may also display AOL field 490, IMAP field 492, IMAP-SSL field 494, IRC field 496, and Mail field 498 under the "Application" tab 472 for allow the user to selectively enter values for any of these fields, and the user may prescribe whether network traffic that meet the value(s) of the field(s) (examples of communication information 500a/500b) is to be excluded or included for forwarding downstream to instrument port(s) of the network switch device 100 according to the map 404. The user may also use the database application field 502a/502b, file transfer application field 504a/504b, management application field 506a/506b, and web application field 508a/508b of the user interface 400 to prescribe whether network traffic belonging to database application, file transfer application, management application, and/or web application is to be excluded or included for forwarding downstream to instrument port(s) of the network switch device 100 according to the map 404.

Figure 4J:
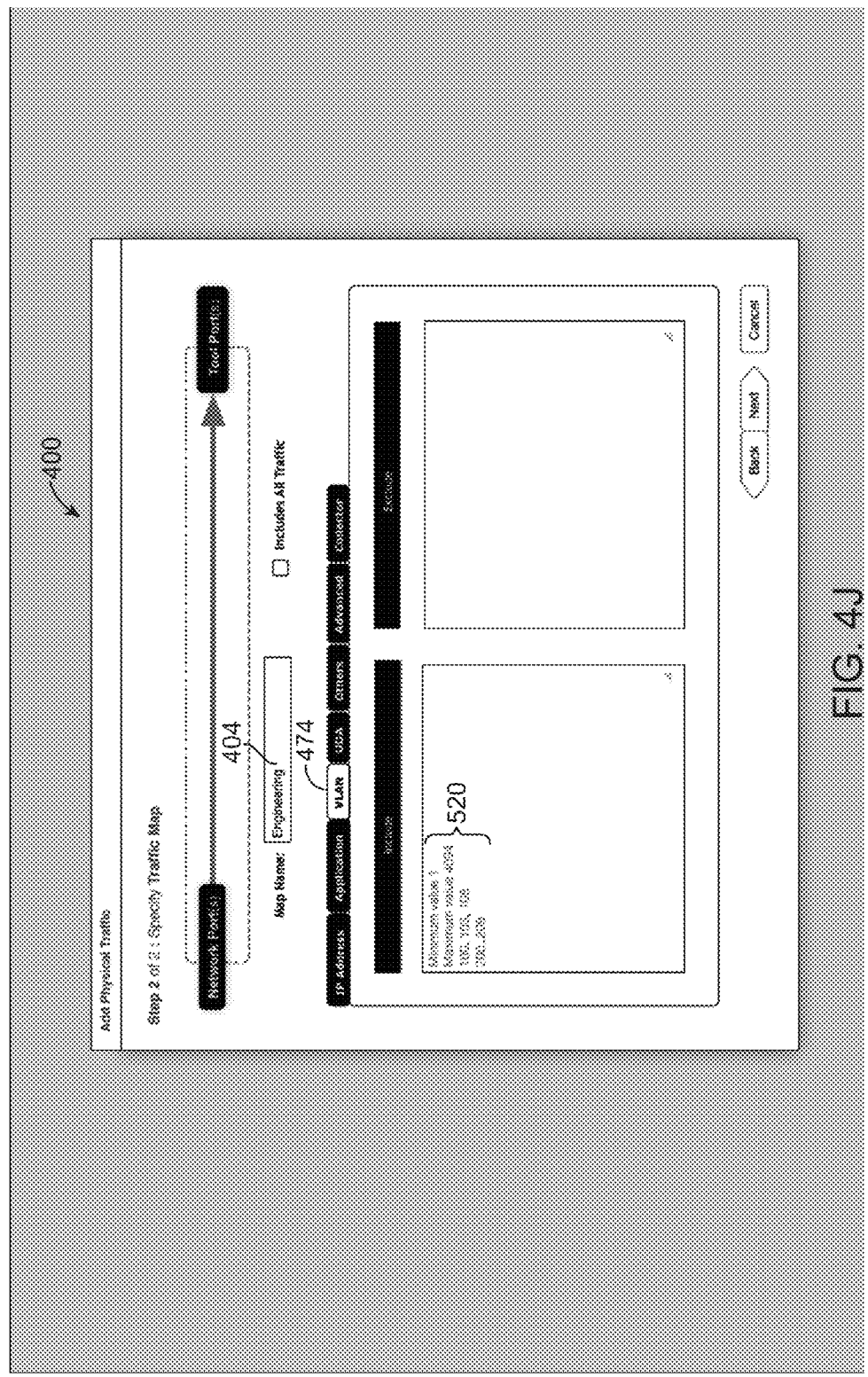

As shown in FIG. 4J, the user interface 400 may also present graphics under the "VLAN" tab 474 to allow a user to enter VLAN information 520, and to prescribe whether network traffic that meets the VLAN information 520 is to be excluded or included for forwarding downstream to instrument port(s) of the network switch device 100 according to the map 404. By means of non-limiting examples, the VLAN information 520 may include VLAN value(s), range(s) of VLAN values, maximum VLAN value, and/or minimum VLAN value.

Figure 4K:
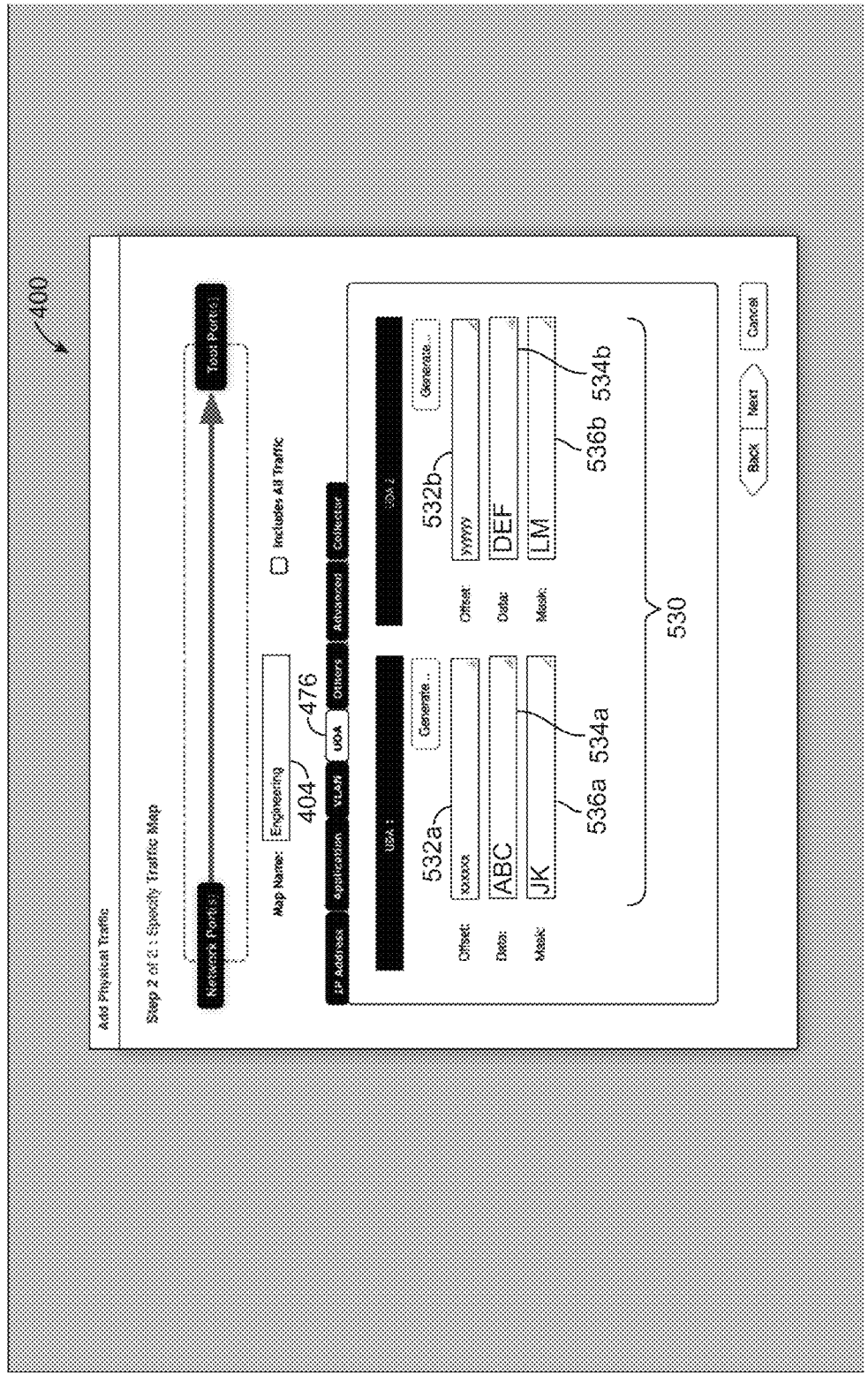

As shown in FIG. 4K, the user interface 400 may also present graphics under the "UDA" tab 476 to allow a user to enter UDA information 530, and to prescribe whether network traffic that meets the UDA information 530 is to be excluded or included for forwarding downstream to instrument port(s) of the network switch device 100 according to the map 404. By means of non-limiting examples, the UDA information 530 may include offset value 532a/532b, data information 534a/534b, and mask information 536a/536b.

Figure 4L:
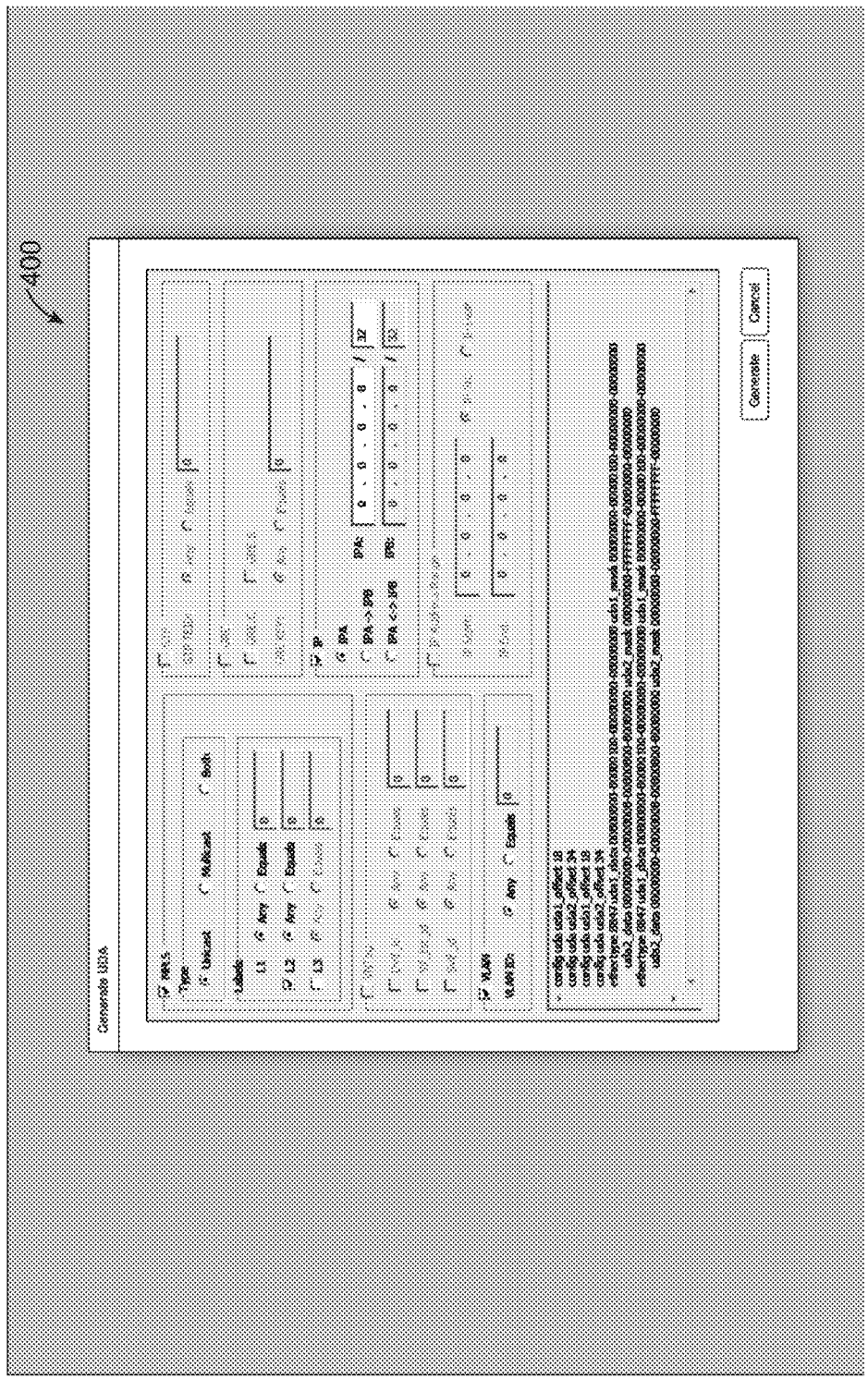

As shown in FIG. 4L, the user interface 400 may also present graphics to allow a user to generate UDA. In some cases, it may be difficult for a user to figure out a complicated UDA number. The user interface 400 is advantageous in that it presents all UDA (e.g., user defined attributes) and a user may simply select the "attributes" they want. Upon selecting the "generate" button, the user interface 400 will generate the UDA number and fill in the text field in FIG. 4L. Based on the UDA number, the device 100 may filter the "attributes" that the user selected.

Figure 4M:
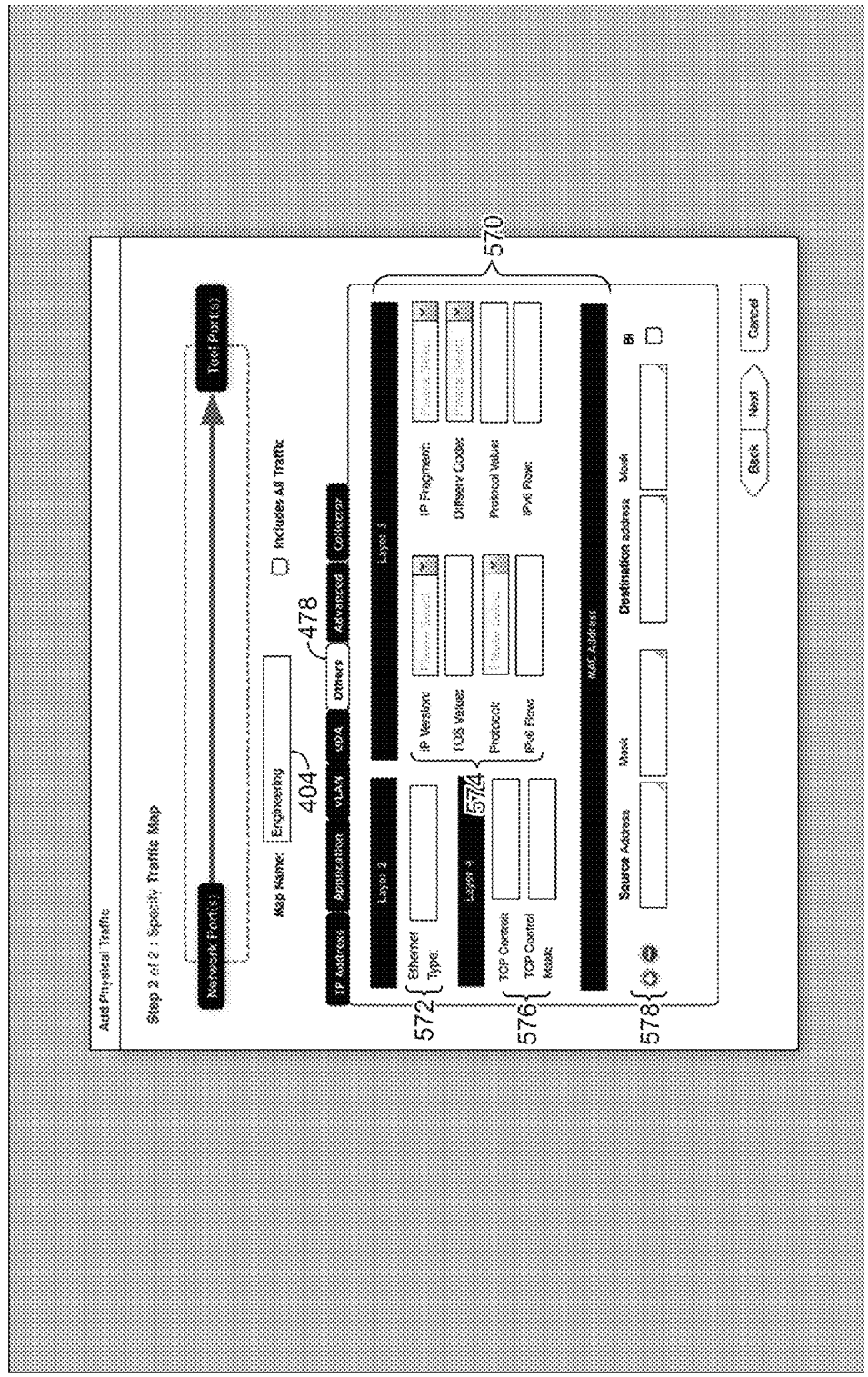

As shown in FIG. 4M, the user interface 400 may also present graphics under the "Others" tab 478 to allow a user to enter other traffic information 570, and to prescribe whether network traffic that meets the information 570 is to be excluded or included for forwarding downstream to instrument port(s) of the network switch device 100 according to the map 404. By means of non-limiting examples, the traffic information 570 may include Layer 2 information 572, Layer 3 information 574, Layer 4 information 576, and/or Mac address information 578.

Figure 4N:
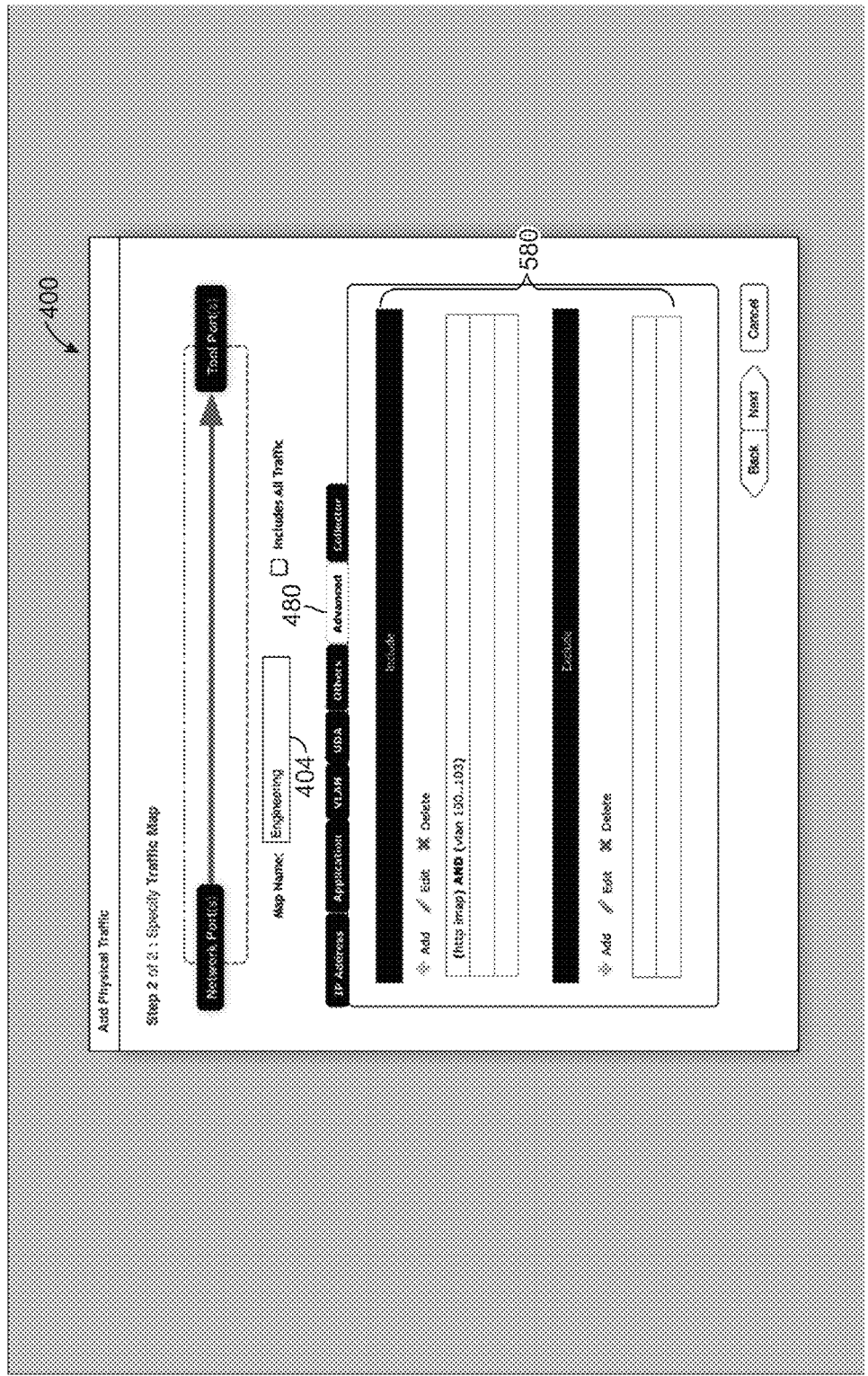
Figure 40:
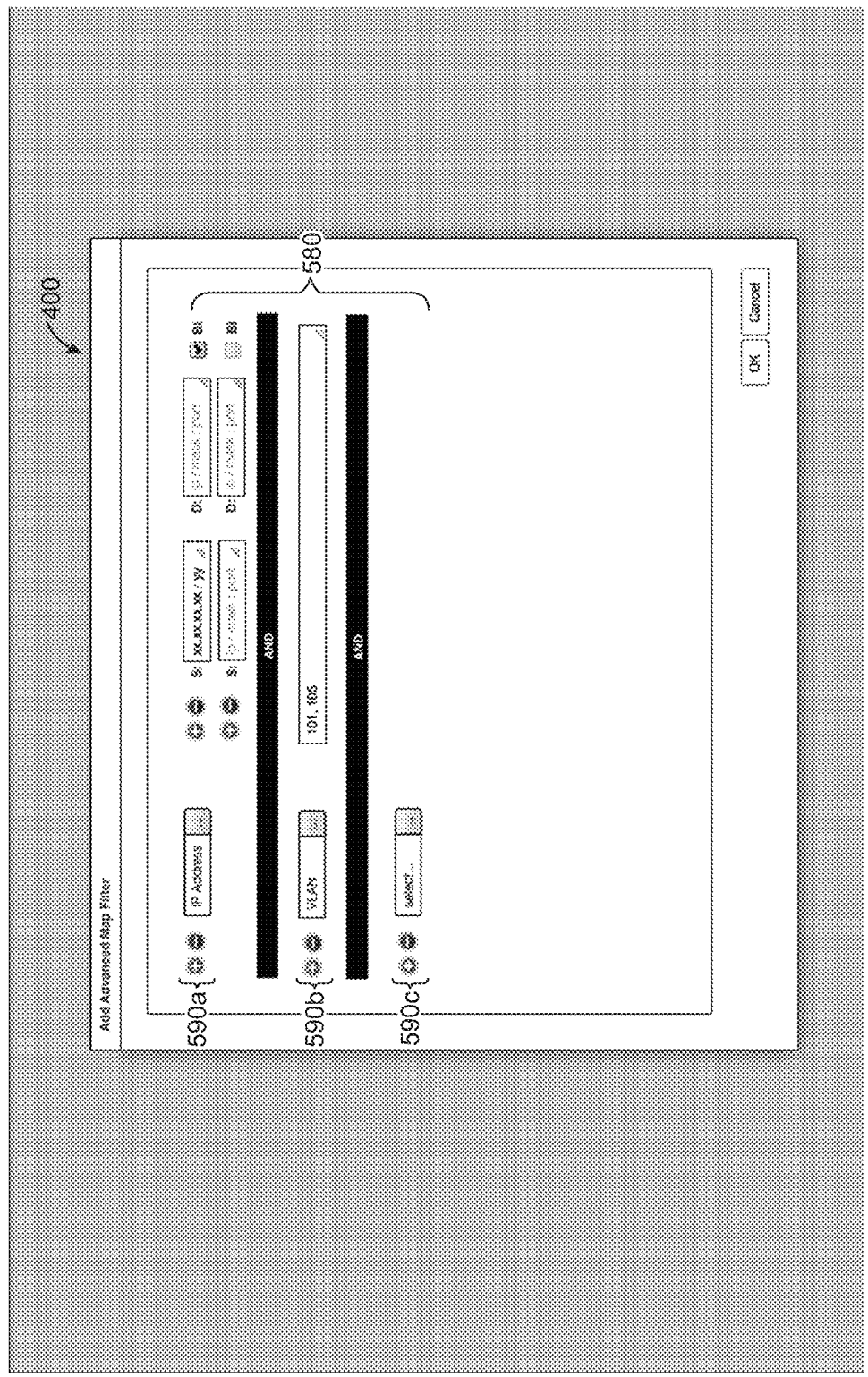

As shown in FIG. 4N, the user interface 400 may also present graphics under the "Advanced" tab 480 to allow a user to enter advance configuration information 580, and to prescribe whether network traffic that meets the advance configuration information 580 is to be excluded or included for forwarding downstream to instrument port(s) of the network switch device 100 according to the map 404. In the advanced mode, the user may set up a filter where multiple set of rules are connected by "AND" operator. FIG. 4O illustrates an example. Also, as shown in FIG. 4O, the user interface 400 may also present graphics to allow a user to enter combination of traffic filtering criteria 590a-590c (examples of advance configuration information 580), and to prescribe whether network traffic that meets the combination of traffic filtering criteria is to be excluded or included for forwarding downstream to instrument port(s) of the network switch device 100. In the illustrated example, the combination of traffic filtering criteria includes IP address having address xx.xx.xx.xx/yy, and VLAN having values 101, 105.

It should be noted that the traffic information 410 that may be entered by the user through the user interface 400 are not limited to the examples described in FIGS. 4H-4O, and that the user interface 400 may be configured to allow the user to enter other types of traffic information 410 to create packet mapping/filtering for the network device 100. Also, in one or more embodiments, any of the traffic information 410 may be excluded, and may not be required for a certain map 404.

As discussed, after the instrument port information 406, the network port information 408, and the traffic information 410 have been entered using the user interface 400, the processing unit 502 then stores the information 406, 408, 410 in association with each other. Doing so will constitute creation of the map 404, which may then be used by the network switch device 100 to perform packet processing to implement a desired traffic flow configuration. In some embodiments, the created map 404 may be converted by the processing unit 202 to a format that is understandable by the network switch device 100, and is then transmitted from the processing unit 202 to the network switch device 100 for performing packet processing. In other embodiments, the created map 404 may be transmitted by the processing unit 202 to the network switch device 100, and the network switch device 100 then converts the map 404 to a format that may be used to perform packet filtering. In some embodiments, the processing unit 142 of the network switch device 100 may include a TCAM, which may be configured to read packet filtering rules sequentially. In such cases, the created maps 404 may be converted to a set of rules that the TCAM can understand.

Also, in some embodiments, when one or more maps 404 are processed by the network switch device 100, the network switch device 100 passes packets received from network port(s) to instrument port(s) to achieve a certain traffic flow configuration. For example, using the user interface 400, a traffic flow map 404 may be created, so that when processed by the network switch device 100, (1) packets received from one network port at the network switch device 100 will be passed to one instrument port, (2) packets received from one network port at the network switch device 100 will be passed to multiple instrument ports, (3) packets received from multiple network ports at the network switch device 100 will be passed to one instrument port, or (4) packets received from multiple network ports at the network switch device 100 will be passed to multiple instrument ports, based on the packets satisfying the traffic information 410 in the map 404.

Figure 4P:
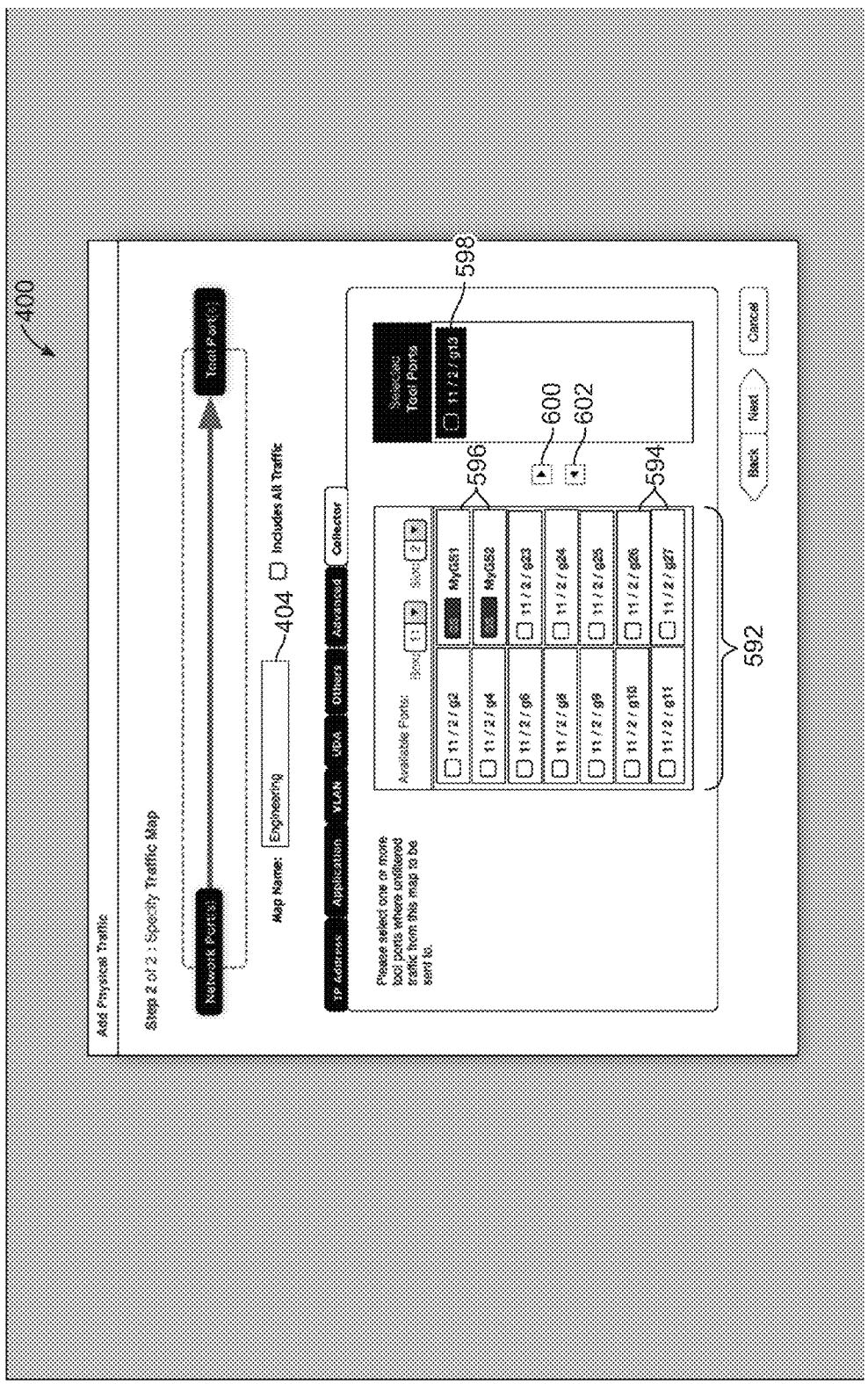
Figure 4Q:
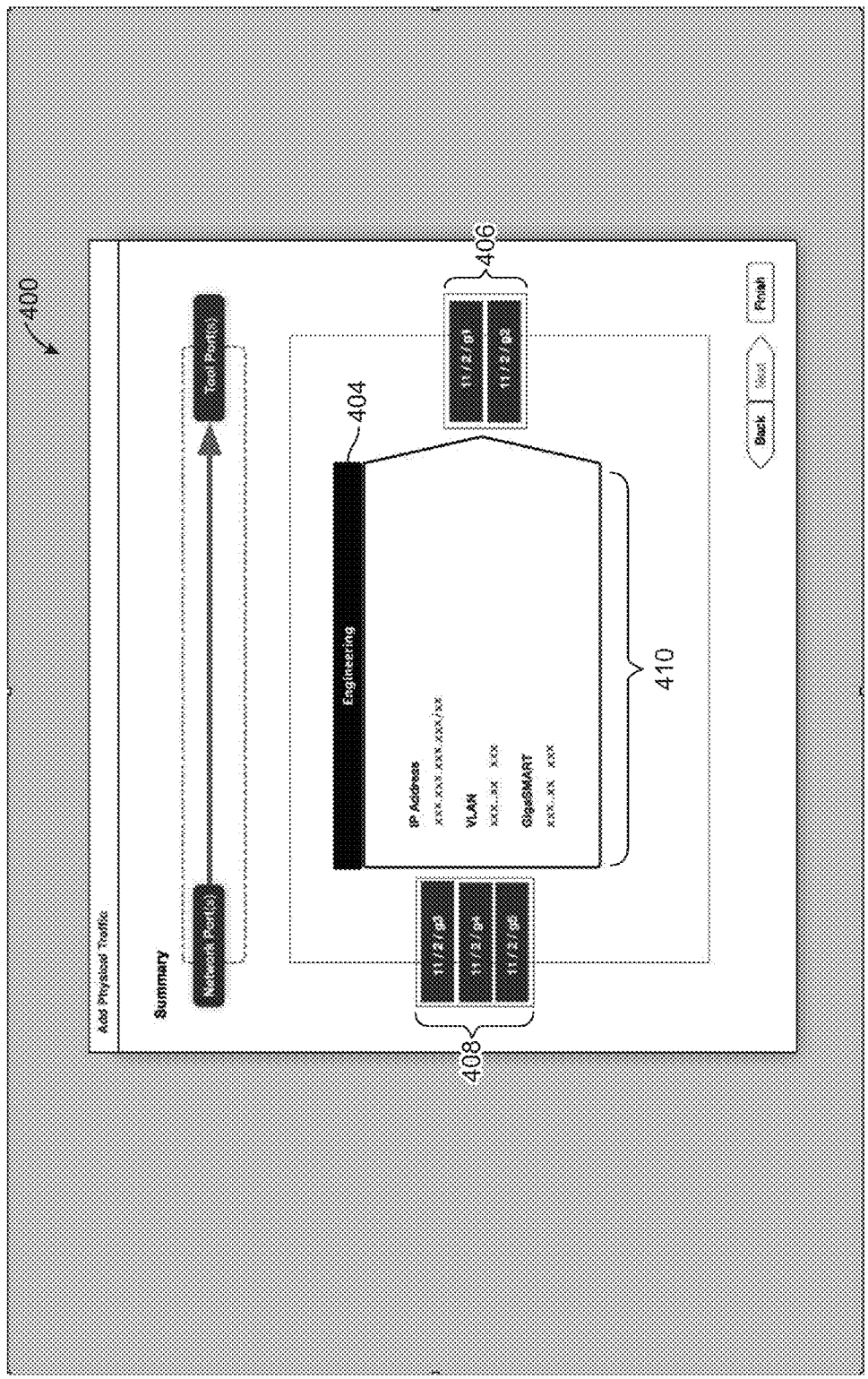

FIG. 4Q illustrates an example of a traffic flow map 404 created using the user interface 400. The traffic flow map 404 may be displayed by the user interface 400 to provide a summary of the map 404 to the user. In the example, the map 404 has a name "Engineering". In the map 404, port numbers g3, g4, g5 are prescribed as network ports according to the network port information 408, and port numbers g1, g2 are prescribed as instrument ports according to the instrument port information 406. Also, the traffic information 410 of the map 404 may be displayed for viewing by the user. According to the map 404, packets received from network ports g3, g4, g5 and having attributes that match those in the traffic information 410, will be passed to instrument ports g1, g2 of the network switch device 100. Network monitoring tools communicatively coupled to these instrument ports g1, g2 then receive these packets, and perform packet analysis.

In some embodiments, the user interface 400 may optionally also provide graphics for allowing a user to define collector rule(s). A collector rule may be used to collect packets that do not satisfy any of the map rules (e.g., packets that are not forwarded to any network monitoring tool). FIG. 4P illustrates the user interface 400 providing graphics for allowing the user to define collector rule for a certain map 404 in accordance with some embodiments. As shown in FIG. 4P, the user may select one of the maps 404 for defining the collector rule. In the illustrated example, the map "Engineering" 404 has been selected. The user may select one or more port(s) for the collector rule. In some embodiments, the user interface 400 may display a list 592 of available ports 594 for allowing the user to select. The list 592 may optionally also includes network device identifier(s) 596 (or identifier(s) of port(s) that have been assigned for communication with other network device(s)). In the illustrated example, the user has selected port g13 (using the assign button 600) to be the collector port 598 for the collector rule being defined. Thus, when the collector rule for the map "Engineering" 404 is being applied by the network switch device 100, all packets that do not satisfy the traffic information in the map "Engineering" 404 will be forwarded to collector port g13. The user may also use the un-assign button 602 to un-select a collector port. In some cases, collector rule(s) may be defined using the user interface 400 so that two or more maps 404 may share one or more collector port(s). In some embodiments, after the collector rule has been defined, the user interface 400 may provide graphics for allowing a user to edit the defined collector rule. Furthermore, in some embodiments, the user interface 400 may also provide graphics for allowing a user to add collector port(s) 598 for existing map(s) 404.

In some embodiments, the instrument port information 406, the network port information 408, and the traffic information 410, for a map 404 may be selectively entered in any order desired by the user. In other embodiments, the user interface 400 may be configured to allow the traffic information 410 be entered for a map 404 only after the instrument port information 406 and/or the network port information 408 has been entered for the map 404. In further embodiments, the user interface 400 may be configured to allow the traffic information 410 and the network port information 408 for a map 404 be entered only after the instrument port information 406 for the map 404 has been entered. Such feature may be non-intuitive because defining the instrument port(s) first before the network port(s) is the opposite direction from the flow of the packets (which normally travels from the network port(s) to the instrument port(s)). However, such feature may be desirable because certain network monitoring tool may be dedicated to perform packet analysis for certain types of packets. Thus, it may be easier for the user to define a network traffic flow map by requiring the user to think about the instrument port(s) first, and then deciding on the traffic information and network port(s) to be associated with the instrument port(s). For example, if a network monitoring tool is dedicated for analyzing email packets, then a user may find it easier to first assign certain instrument port for communicating with such network monitoring tool. After the instrument port has been assigned for communicating with such email-analyzer, then the user may assign the network port for receiving email packets, and may define the criteria for the packets that are to be forwarded to the assigned instrument port. Also, allowing the instrument port(s) to be defined first is advantageous because a user may own certain network monitoring instruments that are coupled to certain instrument ports of the device 100. Accordingly, it may be more natural for user to think and organize the maps/filters from the instrument ports. Such workflow may match a user's mental model, and therefore, may make planning, organizing, and reviewing of network traffic flow much more simpler and easier, and may eliminate difficulties and confusions being caused by defining maps/filters in the packet flow direction.

Also, the user interface 400 for allowing the user to define map(s) 404 is advantageous because multiple maps 404 may be created for the same network traffic in some cases to achieve certain traffic flow configuration. In addition, a map 404 may involve multiple network ports and/or multiple instrument ports. Thus, traffic flow configuration from multiple network ports may be achieved using one or more maps 404, and traffic flow configuration going to multiple instrument ports may be achieved using one or more maps 404.

Figure 6:
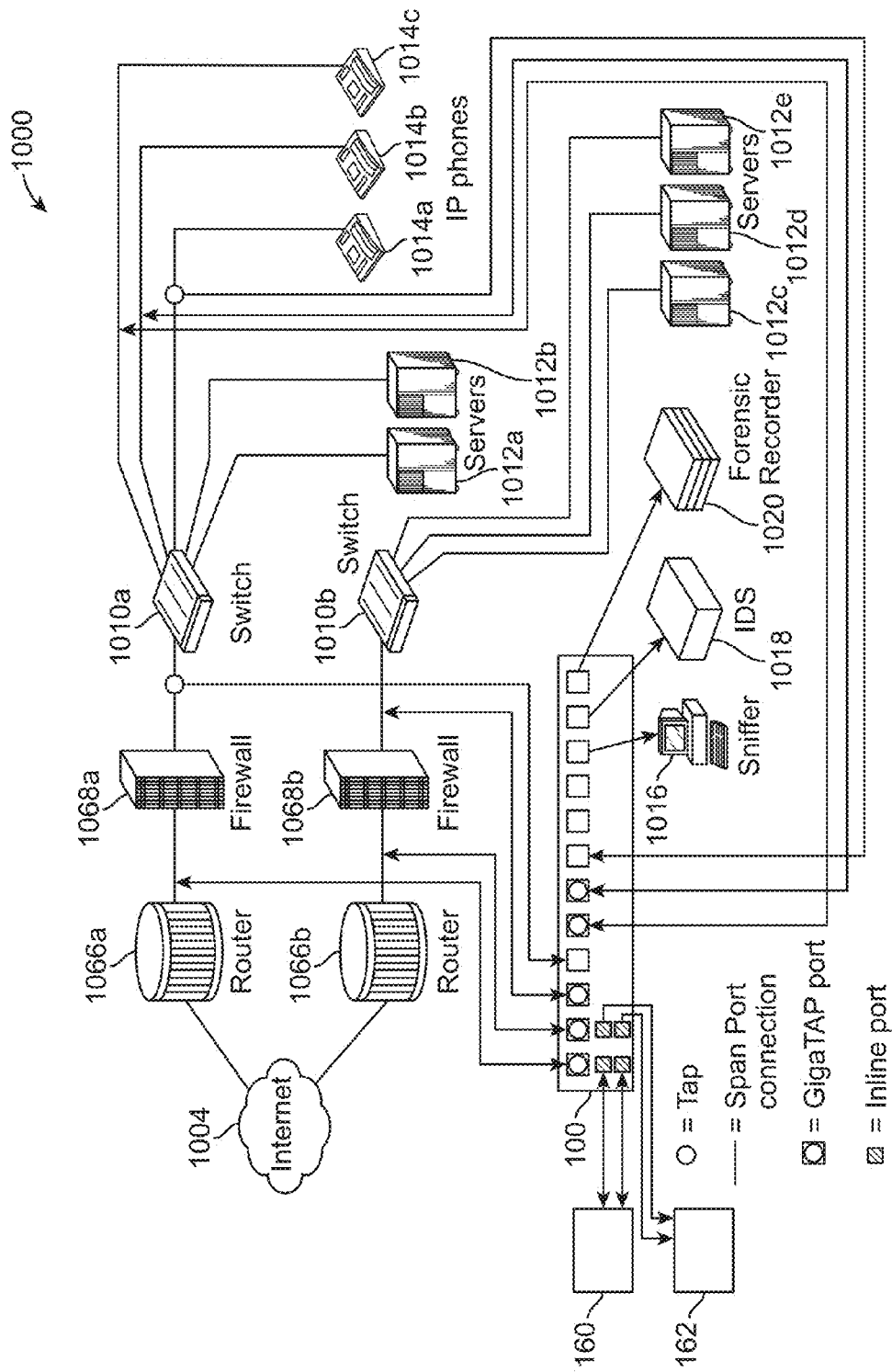
FIG. 6 illustrates a deployment of a network switch appliance in accordance with some embodiments.

FIG. 6 shows the deployment of the network switch device 100 in a network environment 1000 in accordance with some embodiments. The Internet 1004 is coupled via routers 1006*a-b* and firewalls 1068*a-b* to two switches 1010*a* and 1010*b*. Switch 1010*a* is coupled to servers 1012*a-b* and IP phones 1014*a-c*. Switch 1010*b* is coupled to servers 1012*c-e*. A sniffer 1016, an IDS 1018 and a forensic recorder 1020 (collectively, "non-pass through instruments") are coupled to the device 100. As illustrated in FIG. 6, there is a reduction on the number of non-pass through instruments in this deployment as compared to a conventional configuration (in which there may be one or more non-pass through instruments between router 1066*a* and firewall 1068*a*, one or more non-pass through instruments between firewall 1068*a* and switch 1010*a*, one or more non-pass through instruments between router 1066*b* and firewall 1068*b*, and firewall 1068*b* and switch 1010*b*) because the same non-pass through instruments can now access information anywhere in the network environment 1000 through the device 100. The user has complete flexibility to channel whatever traffic to whatever instrument or groups of non-pass through instruments, using the any-to-any, any-to-many and many-to-one capability of the system in accordance with the different embodiments described herein. For example, all the conversations of the IP phones 1014*a-c* can be easily configured to be sent to an IDS 1018. It is also possible that traffic inside a particular IP phone 1014*a-c* connection can be sent to a sniffer 1016, and Intrusion Detection System 1018 and a forensic recorder 1020 simultaneously via the one-to-many function.

In some embodiments, when using the device 100, one or more non-pass through instruments (such as IDS, sniffer, forensic recorder, etc.) may be connected to instrument port(s), and one or more pass through instruments 140*a*, 140*b* (e.g., IPS) may be connected to other instrument port(s) (e.g., inline port(s)). Such configuration allows non-pass through instrument(s) and pass through instrument(s) to simultaneously monitor the network traffic. Each non-pass through instrument is in listening mode (i.e., it receives packets intended to be communicated between two nodes), and each pass through instrument is in pass-thru mode (i.e., it receives packets intended to be communicated between two nodes, processes them, and then pass the packets downstream towards the intended recipient node). In some cases, by having both an IDS and an IPS connected to the device 100, the device 100 can compare whether the IDS or the IPS sees more threats, and/or can have a redundant protection such that if the IPS misses any threat, the IDS may pick it up.

Computer System Architecture

Figure 7:
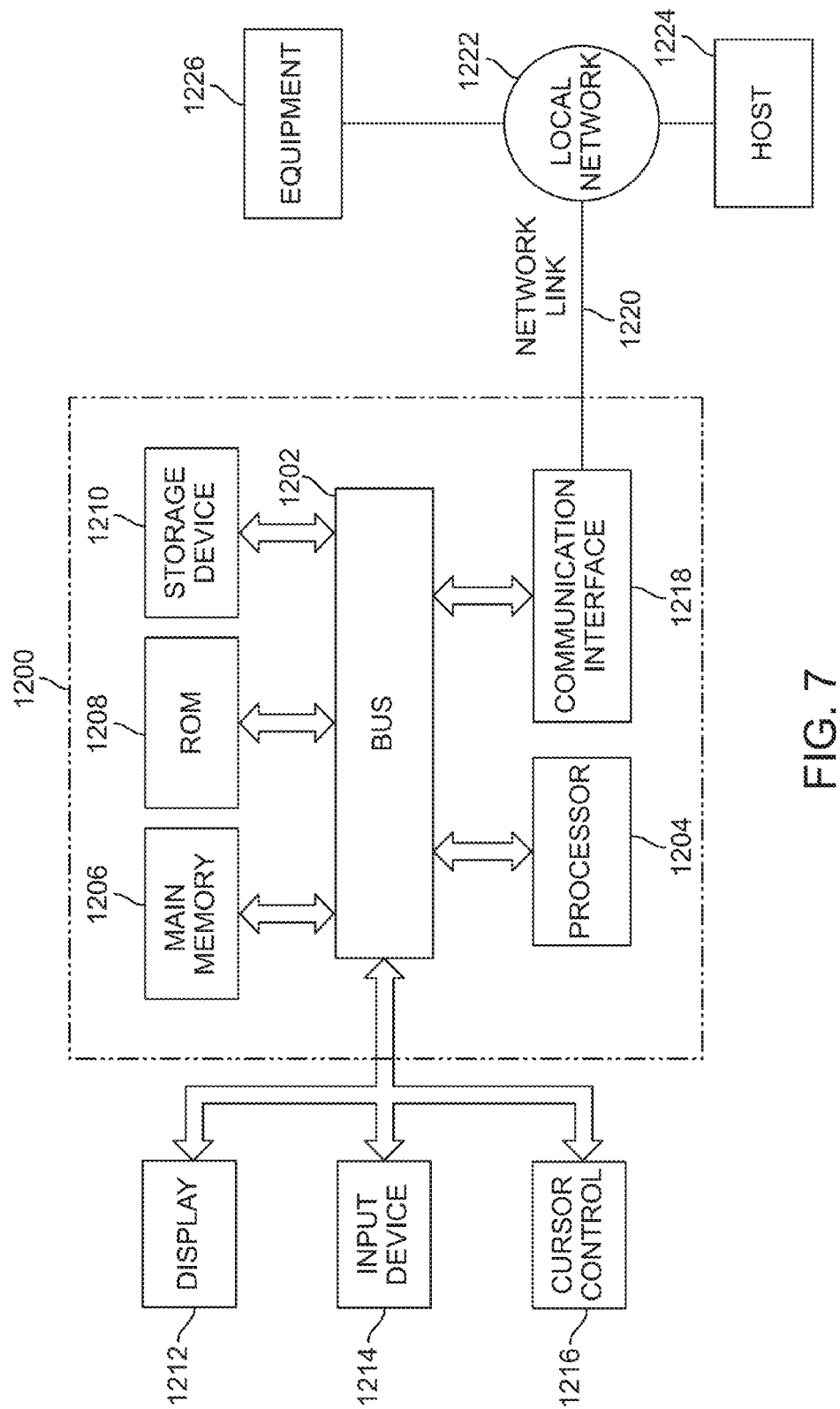
FIG. 7 illustrates an example of a computer system with which embodiments described herein may be implemented.

FIG. 7 is a block diagram that illustrates an embodiment of a computer system 1200 upon which embodiments described herein may be implemented. For example, in some embodiments, the computer system 1200 may be used to implement the apparatus 200 for configuring one or more network appliances. In other embodiments, the computer system 1200 may be implemented as an input device that communicates with the processing unit 202. In further embodiments, the computer system 1200 may be used to implement one or more functions of the processing unit 142, or one or more functions of the switch 140 described herein. Computer system 1200 includes a bus 1202 or other communication mechanism for communicating information, and a processor 1204 coupled with the bus 1202 for processing information. The processor 1204 may be used to perform various functions described herein. For example, in some embodiments, the processor 1204 may receive input from a user for configuring a network component (e.g., the component 380).

The computer system 1200 also includes a main memory 1206, such as a random access memory (RAM) or other dynamic storage device, coupled to the bus 1202 for storing information and instructions to be executed by the processor 1204. The main memory 1206 also may be used for storing temporary variables or other intermediate information during execution of instructions to be executed by the processor 1204. The computer system 1200 further includes a read only memory (ROM) 1208 or other static storage device coupled to the bus 1202 for storing static information and instructions for the processor 1204. A data storage device 1210, such as a magnetic disk or optical disk, is provided and coupled to the bus 1202 for storing information and instructions.

The computer system 1200 may be coupled via the bus 1202 to a display 1212, such as a cathode ray tube (CRT) or a LCD monitor, for displaying information to a user. An input device 1214, including alphanumeric and other keys, is coupled to the bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The computer system 1200 may be used for performing various functions in accordance with the embodiments described herein. According to one embodiment, such use is provided by computer system 1200 in response to processor 1204 executing one or more sequences of one or more instructions contained in the main memory 1206. Such instructions may be read into the main memory 1206 from another computer-readable medium, such as storage device 1210. Execution of the sequences of instructions contained in the main memory 1206 causes the processor 1204 to perform the process steps described herein. One or more processors in a multi-processing arrangement may also be employed to execute the sequences of instructions contained in the main memory 1206. In alternative embodiments, hard-wired circuitry may be used in place of or in combination with software instructions to implement features of the embodiments described herein. Thus, embodiments described herein are not limited to any specific combination of hardware circuitry and software.

The term "computer-readable medium" as used herein refers to any medium that participates in providing instructions to the processor 1204 for execution. Such a medium may take many forms, including but not limited to, non-volatile media, volatile media, and transmission media. Non-volatile media includes, for example, optical or magnetic disks, such as the storage device 1210. A non-volatile medium may be considered to be an example of a non-transitory medium. Volatile media includes dynamic memory, such as the main memory 1206. A volatile medium may be considered to be another example of a non-transitory medium. Transmission media includes coaxial cables, copper wire and fiber optics, including the wires that comprise the bus 1202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to the processor 1204 for execution. For example, the instructions may initially be carried on a magnetic disk of a remote computer. The remote computer can load the instructions into its dynamic memory and send the instructions over a telephone line using a modem. A modem local to the computer system 1200 can receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1206, from which the processor 1204 retrieves and executes the instructions. The instructions received by the main memory 1206 may optionally be stored on the storage device 1210 either before or after execution by the processor 1204.

The computer system 1200 also includes a communication interface 1218 coupled to the bus 1202. The communication interface 1218 provides a two-way data communication coupling to a network link 1220 that is connected to a local network 1222. For example, the communication interface 1218 may be an integrated services digital network (ISDN) card or a modem to provide a data communication connection to a corresponding type of telephone line. As another example, the communication interface 1218 may be a local area network (LAN) card to provide a data communication connection to a compatible LAN. Wireless links may also be implemented. In any such implementation, the communication interface 1218 sends and receives electrical, electromagnetic or optical signals that carry data streams representing various types of information.

The network link 1220 typically provides data communication through one or more networks to other devices. For example, the network link 1220 may provide a connection through local network 1222 to a host computer 1224 or to equipment 1226 such as a radiation beam source or a switch operatively coupled to a radiation beam source. The data streams transported over the network link 1220 can comprise electrical, electromagnetic or optical signals. The signals through the various networks and the signals on the network link 1220 and through the communication interface 1218, which carry data to and from the computer system 1200, are exemplary forms of carrier waves transporting the information. The computer system 1200 can send messages and receive data, including program code, through the network(s), the network link 1220, and the communication interface 1218.

It should be noted that when a "packet" is described in this application, it should be understood that it may refer to the original packet that is transmitted from a node, or a copy of it.

It should be noted that the terms "first", "second", etc., are used to refer to different things, and do not necessarily refer to the order of things.

Although particular embodiments have been shown and described, it will be understood that they are not intended to limit the claimed inventions, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

What is claimed:

1. A method for use to configure a network switch device to implement a traffic flow configuration, the network switch device having a plurality of network ports and a plurality of instrument ports, the method comprising:
    receiving instrument port information that identifies one or more of the instrument ports for the traffic flow configuration, wherein the instrument port information is received by a processing unit;
    receiving network port information that identifies one or more of the network ports for the traffic flow configuration;
    receiving traffic information that identifies one or more network traffic for the traffic flow configuration, wherein the traffic information is received after the instrument port information is received or after the network port information is received; and
    storing the instrument port information, the traffic information, and the network port information in association with each other to implement the traffic flow configuration.

2. The method of claim 1, wherein the traffic flow configuration prescribes packets from the one or more of the network ports identified by the network port information, and belonging to the one or more network traffic identified in the traffic Information, to be passed to the one or more of the instrument ports identified in the instrument port information.

3. The method of claim 1, further comprising providing a user interface for allowing input of the instrument port information, the network port information, and the traffic information.

4. The method of claim 3, wherein the user interface comprises:
    an instrument port section that allows input of the instrument port information;
    a network port section that allows input of the network port information; and a traffic information section that allows input of the traffic information.

5. The method of claim 4, wherein the instrument port section includes a field for selecting the network switch device from a plurality of network switch devices that are communicatively coupled to each other.

6. The method of claim 4, wherein the instrument port section includes a field for selecting a slot from a plurality of slots that are associated with the network switch device.

7. The method of claim 4, wherein the instrument port section includes a field for allowing a user to prescribe one of the one or more instrument ports for communicating with a network device.

8. The method of claim 7, wherein the network switch device and the network device are both out-of-band devices.

9. The method of claim 7, wherein the network port section includes a field for allowing the user to prescribe one of the one or more network ports for communicating with the network device; and
wherein the prescribed one of the one or more instrument ports is for outputting data to the network device, and the prescribed one of the one or more network ports is for receiving data from the network device.

10. The method of claim 7, wherein the network device comprises an ancillary device configured to provide a packet processing function for the network switch device.

11. The method of claim 7, wherein the network device comprises another network switch device.

12. The method of claim 4, wherein the network port section includes a field for allowing a user to prescribe one of the one or more network ports for communicating with a network device.

13. The method of claim 12, wherein the network switch device and the network device are both out-of-band devices.

14. The method of claim 1, wherein the traffic information comprises one or more of source information, destination information, bi-directional identifier, traffic type information, VLAN information, UDA information, Layer 2 information, Layer 3 information, Layer 4 information, and traffic filter information.

15. An apparatus for use to configure a network switch device to implement a traffic flow configuration, the network switch device having a plurality of network ports and a plurality of instrument ports, the apparatus comprising:
a processing unit configured for
receiving instrument port information that identifies one or more of the instrument ports for the traffic flow configuration,
receiving network port information that identifies one or more of the network ports for the traffic flow configuration, and
after the instrument port information is received or after the network port information is received, receiving traffic information that identifies one or more network traffic for the traffic flow configuration; and
a non-transitory medium configured for storing the instrument port information, the traffic information, and the network port information in association with each other to implement the traffic flow configuration.

16. The apparatus of claim 15, wherein the traffic flow configuration prescribes packets from the one or more of the network ports identified by the network port information, and belonging to the one or more network traffic identified in the traffic Information, to be passed to the one or more of the instrument ports identified in the instrument port information.

17. The apparatus of claim 15, further comprising a user interface for allowing input of the instrument port information, the network port information, and the traffic information.

18. The apparatus of claim 17, wherein the user interface comprises:
an instrument port section that allows input of the instrument port information;
a network port section that allows input of the network port information; and
a traffic information section that allows input of the traffic information.

19. The apparatus of claim 18, wherein the instrument port section includes a field for selecting the network switch device from a plurality of network switch devices that are communicatively coupled to each other.

20. The apparatus of claim 18, wherein the instrument port section includes a field for selecting a slot from a plurality of slots that are associated with the network switch device.

21. The apparatus of claim 18, wherein the instrument port section includes a field for allowing a user to prescribe one of the one or more instrument ports for communicating with a network device.

22. The apparatus of claim 21, wherein the network switch device and the network device are both out-of-band devices.

23. The apparatus of claim 21, wherein the network port section includes a field for allowing the user to prescribe one of the one or more network ports for communicating with the network device; and
wherein the prescribed one of the one or more instrument ports is for outputting data to the network device, and the prescribed one of the one or more network ports is for receiving data from the network device.

24. The apparatus of claim 21, wherein the network device comprises an ancillary device configured to provide a packet processing function for the network switch device.

25. The apparatus of claim 21, wherein the network device comprises another network switch device.

26. The apparatus of claim 18, wherein the network port section includes a field for allowing a user to prescribe one of the one or more network ports for communicating with a network device.

27. The apparatus of claim 26, wherein the network switch device and the network device are both out-of-band devices.

28. The apparatus of claim 15, wherein the traffic information comprises one or more of source information, destination information, bi-directional identifier, traffic type information, VLAN information, UDA information, Layer 2 information, Layer 3 information, Layer 4 information, and traffic filter information.

29. A computer product having a non-transitory medium storing instruction, an execution of which causes a method for use to configure a network switch device to implement a traffic flow configuration to be performed, the network switch device having a plurality of network ports and a plurality of instrument ports, the method comprising:
receiving instrument port information that identifies one or more of the instrument ports for the traffic flow configuration;
receiving network port information that identifies one or more of the network ports for the traffic flow configuration;
receiving traffic information that identifies one or more network traffic for the traffic flow configuration, wherein the traffic information is received after the instrument port information is received or after the network port information is received; and storing the instrument port information, the traffic information, and the network port information in association with each other to implement the traffic flow configuration.

\* \* \* \* \*